(12) United States Patent
Liu et al.

(10) Patent No.: US 11,239,975 B2
(45) Date of Patent: Feb. 1, 2022

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Liqing Liu, Sakai (JP); Shoichi Suzuki, Sakai (JP); Wataru Ouchi, Sakai (JP); Tomoki Yoshimura, Sakai (JP); Tatsushi Aiba, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 263 days.

(21) Appl. No.: 16/324,155

(22) PCT Filed: Aug. 9, 2017

(86) PCT No.: PCT/JP2017/029010
§ 371 (c)(1),
(2) Date: Feb. 8, 2019

(87) PCT Pub. No.: WO2018/030494
PCT Pub. Date: Feb. 15, 2018

(65) Prior Publication Data
US 2019/0182012 A1 Jun. 13, 2019

(30) Foreign Application Priority Data
Aug. 9, 2016 (JP) .............................. JP2016-156244

(51) Int. Cl.
*H04L 5/00* (2006.01)
*H04W 72/04* (2009.01)
*H04W 28/04* (2009.01)

(52) U.S. Cl.
CPC ............ *H04L 5/0055* (2013.01); *H04W 28/04* (2013.01); *H04W 72/04* (2013.01); *H04W 72/0446* (2013.01)

(58) Field of Classification Search
CPC ..... H04L 5/0055; H04W 28/04; H04W 72/04; H04W 72/0446
See application file for complete search history.

(56) References Cited

U.S. PATENT DOCUMENTS 9,439,095 B2\* 9/2016 He ...................... H04W 72/082
2011/0243066 A1\* 10/2011 Nayeb Nazar ........ H04L 1/1671
370/328

(Continued)

FOREIGN PATENT DOCUMENTS

| EP | 3 598 683 A1 | 1/2020 |
|---|---|---|
| JP | 2013-183299 A | 9/2013 |

(Continued)

OTHER PUBLICATIONS

Official Communication issued in International Patent Application No. PCT/JP2017/029010, dated Oct. 31, 2017.

(Continued)

*Primary Examiner* — Chi H Pham
*Assistant Examiner* — Weibin Huang

(57) ABSTRACT

A terminal apparatus includes: a reception unit configured to: receive a PDCCH or an EPDCCH with a DCI format and a first RRC parameter, and decode a PDSCH according to detection of the PDCCH or the EPDCCH; and a transmission unit configured to: transmit a HARQ-ACK in a subframe n according to detection of the PDSCH in a subframe n-k. Whether the PUCCH resource is given at least based on the first RRC parameter is determined at least based on part of or all of the first condition and the second condition described below:
first condition: the value k, and (Continued)

second condition: which one of CSS and USS is a search space to which a physical downlink control channel including the DCI format is mapped.

4 Claims, 11 Drawing Sheets

(56) References Cited

U.S. PATENT DOCUMENTS

| | | | | |
|---|---|---|---|---|
| 2012/0307755 A1* | 12/2012 | Kim | ...................... | H04L 1/1825 |
| | | | | 370/329 |
| 2014/0161001 A1* | 6/2014 | Gao | ...................... | H04L 5/0055 |
| | | | | 370/280 |
| 2015/0023228 A1* | 1/2015 | Yin | ........................ | H04L 5/001 |
| | | | | 370/280 |
| 2015/0085714 A1* | 3/2015 | Liang | .................... | H04L 1/1614 |
| | | | | 370/280 |
| 2015/0124664 A1* | 5/2015 | Park | ...................... | H04L 5/0092 |
| | | | | 370/280 |
| 2017/0142712 A1* | 5/2017 | Lee | ........................ | H04L 5/0094 |
| 2018/0042015 A1 | 2/2018 | Yin et al. | | |

FOREIGN PATENT DOCUMENTS

| | | |
|---|---|---|
| JP | 2013-229771 A | 11/2013 |
| WO | 2018031494 A1 | 2/2018 |

OTHER PUBLICATIONS

"3rd Generation Partnership Project; Technical Specification Group Radio Access Network; Evolved Universal Terrestrial Radio Access (E-UTRA); Study on latency reduction techniques for LTE (Release 13)", 3GPP TR 36.881 V0.5.2, Feb. 2016, 140 pages.

Ericsson, "New Work Item on shortened TTI and processing time for LTE", 3GPP TSG RAN Meeting #72, RP-161299, Jun. 13-16, 2016, 8 pages.

* cited by examiner

FIG. 8A

Mapping of shift Field in DCI format 1A/1B/1D/1/2A/2/2B/2C/2D to $\triangle_{shift}$ values

| Shift field (2 bits) in DCI format 1A/1B/1D/1/2A/2/2B/2C/2D | $\triangle_{shift}$ |
|---|---|
| 00 | 0 |
| 01 | a |
| 10 | -b |
| 11 | -c |

FIG. 8B

Mapping of shift Field in DCI format 1A/1B/1D/1/2A/2/2B/2C/2D to $\triangle_{shift}$ values

| Shift field (3 bits) in DCI format 1A/1B/1D/1/2A/2/2B/2C/2D | $\triangle_{shift}$ |
|---|---|
| 000 | 0 |
| 001 | d |
| 010 | e |
| 011 | f |
| 100 | -g |
| 101 | -h |
| 110 | -i |
| 111 | -j |

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-156244 filed on Aug. 9, 2016, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied (NPL 1). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. In such a cellular communication system, a single base station apparatus may manage multiple cells.

In the 3GPP, latency reduction enhancements have been studied. Examples of solutions under study for reducing latency include Semi-Persistent Scheduling (SPS), uplink grant reception (UL Grant reception), and configured semi-persistent scheduling activation and deactivation (Configured SPS activation and deactivation) have been studied (NPL 1). Furthermore, there have been solutions under study for reducing the processing time for a legacy (1 ms) Transmission Time Interval (TTI). (NPL 2)

CITATION LIST

Non Patent Literature

NPL 1: "3GPP TR 36.881 V0.5.2 (2016-02) Evolved Universal Terrestrial Radio Access (E-UTRA); Study on latency reduction techniques for LTE (Release13)", R2-161963, Ericsson.

NPL 2: "Work Item on shortened TTI and processing time for LTE", RP-161299, Ericsson, 3GPP TSG RAN Meeting #72, Busan, Korea, Jun. 13-16, 2016

SUMMARY OF INVENTION

Technical Problem

However, in the radio communication system as described above, a PUCCH resource allocated to a terminal apparatus with the processing time of TTI reduced and a PUCCH resource allocated to a terminal apparatus with the processing time of TTI not reduced are the same uplink subframe, and thus are overlapped. As a result, contention of the PUCCH resources can occur between the terminal apparatuses.

An aspect of the present invention provides a terminal apparatus, a base station apparatus, a communication method, and an integrated circuit with which HARQ-ACK for a transport block transmitted with a PDSCH can be efficiently transmitted and/or received, by using a PUCCH resource.

Solution to Problem (1) To accomplish the object described above, aspects of the present invention are contrived to provide the following measures. Specifically, a first aspect of the present invention provides a terminal apparatus including a reception unit configured to: receive a PDCCH or an EPDCCH with a DCI format and a first RRC parameter, and decode a PDSCH according to detection of the PDCCH or the EPDCCH; and a transmission unit configured to: transmit a HARQ-ACK in a subframe n according to detection of the PDSCH in a subframe n−k. Whether the PUCCH resource is given at least based on the first RRC parameter is determined at least based on part of or all of a first condition and a second condition described below:

first condition: the value k, and
    second condition: which one of CSS and USS is a search space to which a physical downlink control channel including the DCI format is mapped.

(2) A second aspect of the present invention provides a base station apparatus that communicates with a terminal apparatus and includes a transmission unit configured to transmit a first RRC parameter, a PDCCH or an EPDCCH with a DCI format, and a PDSCH based on the DCI format; and a reception unit configured to transmit a HARQ-ACK in a subframe n according to transmission of the PDSCH in a subframe n−k. Whether the PUCCH resource is given at least based on the first RRC parameter is determined at least based on part of or all of a first condition and a second condition described below:

first condition: the value k, and
    second condition: which one of CSS and USS is a search space to which a physical downlink control channel including the DCI format is mapped.

(3) A third aspect of the present invention provides a communication method employed for a terminal apparatus. The communication method includes: receiving a PDCCH or an EPDCCH including a DCI format, and a first RRC parameter; decoding a PDSCH according to detection of the PDCCH or the EPDCCH; and transmitting a HARQ-ACK in a subframe n according to detection of the PDSCH in a subframe n−k. Whether the PUCCH resource is given at least based on the first RRC parameter is determined at least based on part of or all of a first condition and a second condition described below:

first condition: the value k, and
    second condition: which one of CSS and USS is a search space to which a physical downlink control channel including the DCI format is mapped.

(4) A fourth aspect of the present invention provides a communication method employed for a base station apparatus that communicates with a terminal apparatus. The communication method includes: transmitting a first RRC parameter, a PDCCH or an EPDCCH including a DCI format, and a PDSCH based on the DCI format; and transmitting a HARQ-ACK in a subframe n according to transmission of the PDSCH in a subframe n−k. Whether the PUCCH resource is given at least based on the first RRC parameter is determined at least based on part of or all of a first condition and a second condition described below:

first condition: the value k, and second condition: which one of CSS and USS is a search space to which a physical downlink control channel including the DCI format is mapped.

(5) A fifth aspect of the present invention provides an integrated circuit mounted on a terminal apparatus. The integrated circuit includes: a receiving circuit configured to: receive a PDCCH or an EPDCCH with a DCI format and a first RRC parameter, and decode a PDSCH according to detection of the PDCCH or the EPDCCH; and a transmitting circuit configured to: transmit a HARQ-ACK in a subframe n according to detection of the PDSCH in a subframe n−k. Whether the PUCCH resource is given at least based on the first RRC parameter is determined at least based on part of or all of a first condition and a second condition described below:

first condition: the value k, and second condition: which one of CSS and USS is a search space to which a physical downlink control channel including the DCI format is mapped.

(6) A sixth aspect of the present invention provides an integrated circuit mounted on a base station apparatus that communicates with a terminal apparatus. The integrated circuit includes: a transmitting circuit configured to transmit a first RRC parameter, a PDCCH or an EPDCCH with a DCI format, and a PDSCH based on the DCI format; and a receiving circuit configured to transmit a HARQ-ACK in a subframe n according to transmission of the PDSCH in a subframe n−k. Whether the PUCCH resource is given at least based on the first RRC parameter is determined at least based on part of or all of a first condition and a second condition described below:

first condition: the value k, and second condition: which one of CSS and USS is a search space to which a physical downlink control channel including the DCI format is mapped.

Advantageous Effects of Invention

With one aspect of the invention, a terminal apparatus and a base station apparatus can each efficiently transmit and/or receive HARQ-ACK for a transport block transmitted with PDSCH, by using a PUCCH.

BRIEF DESCRIPTION OF DRAWINGS

FIG. 8A illustrates one example of a shift field mapped to a value $\Delta_{shift}$ in the present embodiment.

FIG. 8B illustrates another example of a shift field mapped to a value $\Delta_{shift}$ in the present embodiment.

DESCRIPTION OF EMBODIMENTS

Embodiments of the present invention will be described below.

Figure 1:
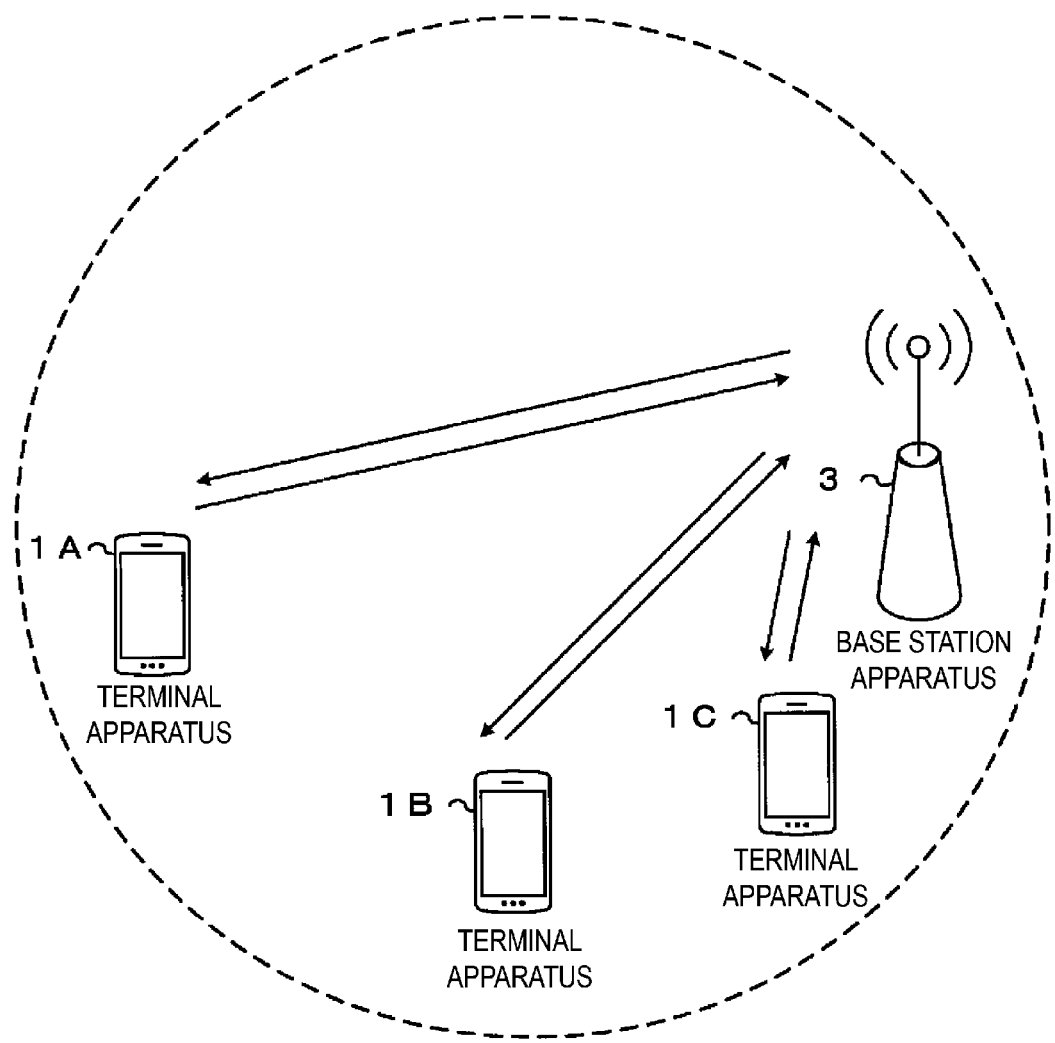
FIG. 1 is a diagram illustrating a concept of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, the terminal apparatuses 1A to 1C are each also referred to as a terminal apparatus 1.

Figure 2:
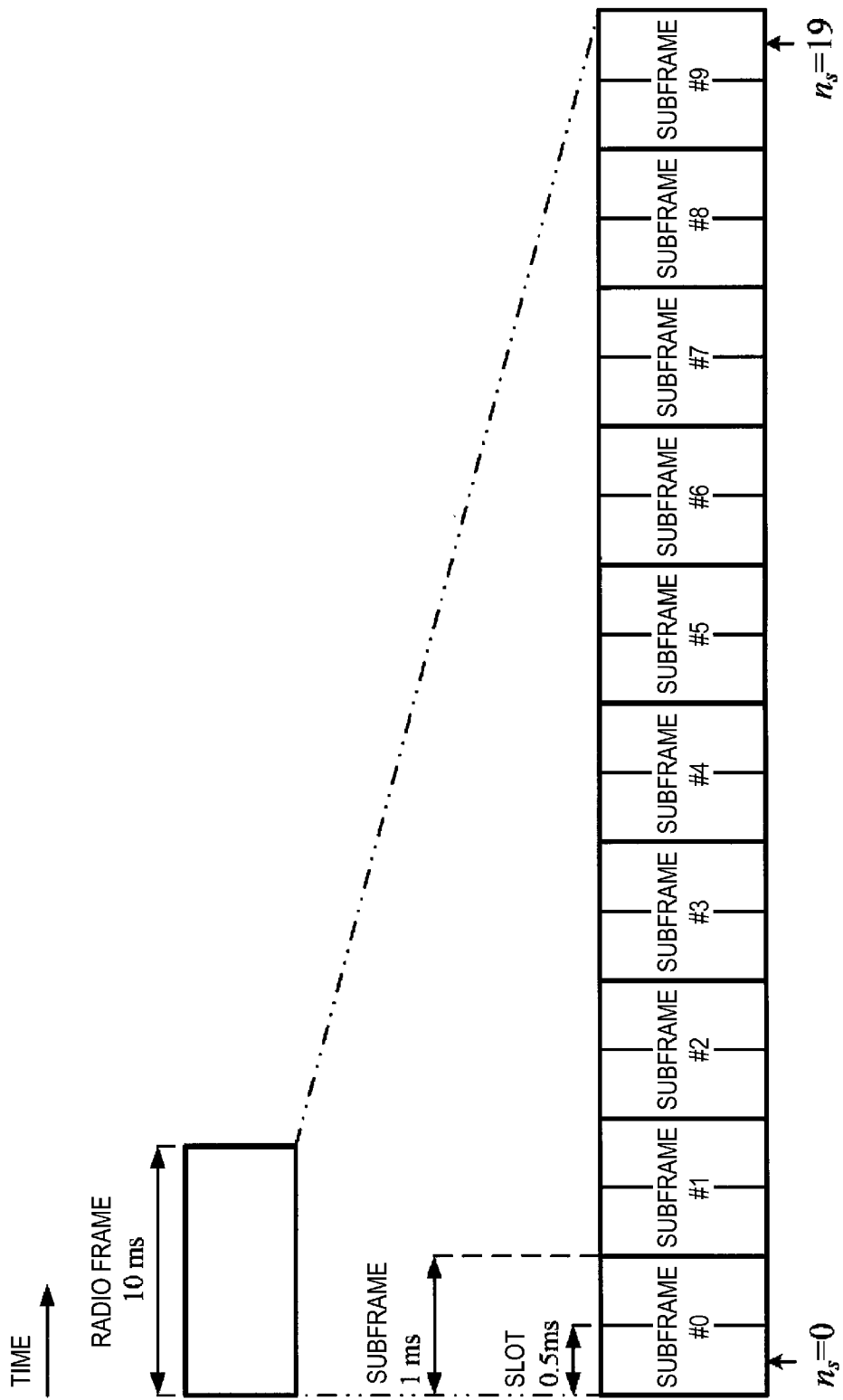
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis.

For example, the sizes of various field in the time domain is expressed by a value with a time unit of $T_s=1/(15000 \cdot 2048)$. The length of a radio frame is $T_f=307200 \cdot T_s=10$ ms. Each of the radio frames may include ten contiguous subframes in the time domain. The length of each subframe is $T_{subframe}=30720 \cdot T_s=1$ ms. Each of subframes i includes two contiguous slots in the time domain. The two contiguous slots in the time domain are a slot having a slot number $n_s$ of 2i in the radio frame and a slot having a slot number $n_s$ of 2i+1 in the radio frame. The length of each of the slots is $T_{slot}=153600 \cdot n_s=0.5$ ms. Each of the radio frames may include ten contiguous subframes in the time domain. Each of the radio frames includes 20 contiguous slots ($n_s=0, 1, \ldots, 19$) in the time domain.

Figure 3:
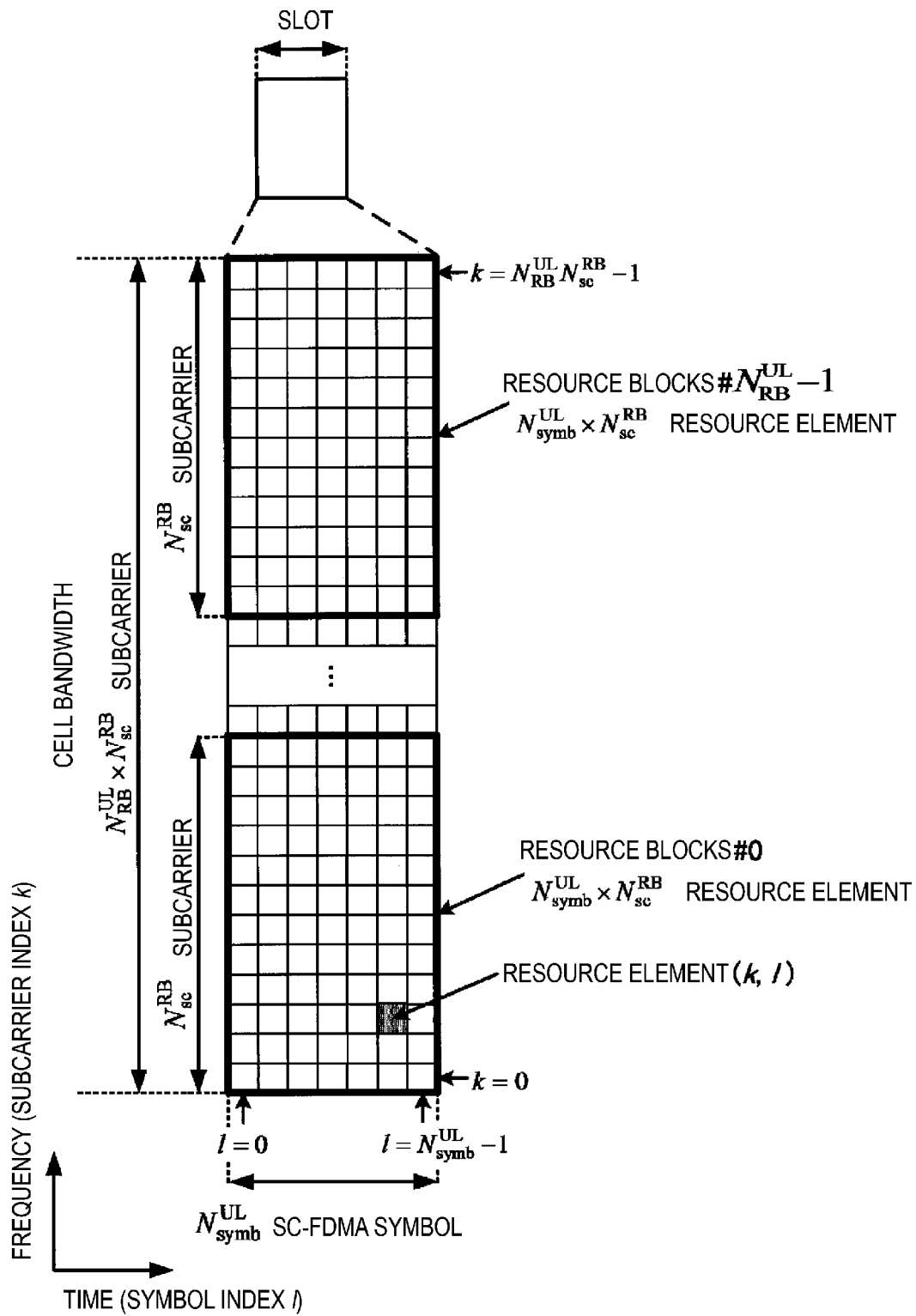
FIG. 3 is a diagram illustrating a schematic configuration of an uplink slot according to the present embodiment.

A configuration of a slot according to the present embodiment will be described below. FIG. 3 is a diagram illustrating a schematic configuration of an uplink slot according to the present embodiment. FIG. 3 illustrates a configuration of a downlink slot in a single cell. In FIG. 3, the horizontal axis is a time axis, and the vertical axis is a frequency axis. In FIG. 3, l is a Single Carrier-Frequency Division Multiple Access (SC-FDMA) symbol number/index and k is a subcarrier number/index.

The physical signal or the physical channel transmitted in each of the slots is expressed by a resource grid. In uplink, the resource grid is defined by multiple subcarriers and multiple SC-FDMA symbols. Each element within the resource grid is referred to as a resource element. The resource element is expressed by a subcarrier number/index k and an SC-FDMA symbol number/index l.

The resource grid is defined for each antenna port. In the present embodiment, description is given for one antenna port. The present embodiment may be applied to each of multiple antenna ports.

The uplink slot includes multiple SC-FDMA symbols l (l=0, 1, . . . , $N^{UL}_{symb}-1$) in the time domain. $N^{UL}_{symb}$ indicates the number of SC-FDMA symbols included in one uplink slot. For a normal Cyclic Prefix (CP), $N^{UL}_{symb}$ may be 7. For an extended Cyclic Prefix (CP), $N^{UL}_{symb}$ may be 6. Thus, for the normal CP, a single subframe includes 14 SC-FDMA symbol. For the extended CP, a single subframe includes 12 SC-FDMA symbols.

The uplink slot includes the plurality of subcarriers k (k=0, 1, . . . , $N^{UL}_{RB}*N^{RB}_{SC}$) in the frequency domain. $N^{UL}_{RB}$ is a uplink bandwidth configuration for the serving cell expressed by a multiple of $N^{RB}_{SC}$. $N^{RB}_{SC}$ is the (physical) resource block size in the frequency domain expressed by the number of subcarriers. In the present embodiment, the subcarrier interval Δf is 15 kHz, $N^{RB}_{SC}$ is 12 subcarriers. Thus, in the present embodiment, $N^{RB}_{SC}$ is 180 kHz.

A resource block is used to express mapping of a physical channel to resource elements. For the resource block, a virtual resource block and a physical resource block are defined. A physical channel is first mapped to a virtual resource block. Thereafter, a virtual resource block is mapped to the physical resource block. One physical resource block is defined by $N^{UL}_{symb}$ consecutive SC-FDMA symbols in the time domain and by $N^{RB}_{SC}$ consecutive subcarriers in the frequency domain. Hence, one physical resource block is constituted by ($N^{UL}_{symb}*N^{RB}_{SC}$) resource elements. One physical resource block may correspond to one slot in the time domain. The physical resource blocks may be numbered nPRB (0, 1, . . . , $N^{UL}_{RB}-1$) in ascending order of frequencies in the frequency domain.

The downlink slot according to the present embodiment includes a plurality of OFDM symbols. The configuration of the downlink slot according to the present embodiment is basically the same as the configuration of the uplink slot except that the resource grid includes a plurality of subcarriers and a plurality of OFDM symbols, and thus the description of the configuration of the downlink slot will be omitted.

Transmission Time Interval (TTI) may be defined for downlink and/or uplink transmission. The downlink and/or uplink transmission may be performed with a single transmission time interval (the length of a single transmission time interval).

For example, the TTI for a downlink includes 14 OFDM symbols (single subframe). A transmission time interval including 13 OFDM symbols or less may be referred to as a short Transmission Interval (sTTI).

A TTI for an uplink includes 14 SC-FDMA symbols (single subframe). A transmission time interval including 13 OFDM symbols or less may be referred to as an sTTI.

Physical channels and physical signals according to the present embodiment will be described.

In FIG. 1, in uplink radio communication from the terminal apparatus 1 to the base station apparatus 3, the following uplink physical channels are used. Here, the uplink physical channels are used to transmit information output from the higher layers.

Physical random access channel (PRACH)
Physical uplink control channel (PUCCH)
Physical uplink shared channel (PUSCH)

The PRACH is used to transmit a random access preamble. A main object of the PRACH (or random access procedure) is to synchronize the terminal apparatus 1 to the base station apparatus 3 in terms of the time domain, for example. The PRACH (or random access procedure) may be used for an initial connection establishment procedure, a handover procedure, a connection re-establishment procedure, uplink transmission synchronization (timing adjustment), and for transmitting a scheduling request (a PUSCH resource request or an UL-SCH resource request).

The PUCCH is used to transmit uplink control information (UCI). Here, the Uplink Control Information may include Channel State Information (CSI) for the downlink. The uplink control information may include a scheduling request (SR) used to request for a UL-SCH resource. The uplink control information may include Hybrid Automatic Repeat request ACKnowledgment (HARQ-ACK).

HARQ-ACK may indicate HARQ-ACK for downlink data (Transport block, Medium Access Control Protocol Data Unit (MAC PDU), Downlink-Shared Channel (DL-SCH), or Physical Downlink Shared Channel (PDSCH)). In other words, HARQ-ACK may indicate ACKnowledgment, that is positive-ACKnowledgment (ACK) or Negative-ACKnowledgment (NACK). The CSI may include a channel quality indicator (CQI), a precoding matrix indicator (PMI), and/or rank indication (RI). HARQ-ACK may also be referred to as a HARQ-ACK response or an ACK/NACK response.

The PUSCH is used for transmission of uplink data (Uplink-Shared Channel (UL-SCH)). PUSCH is used to transmit a random access message 3. Furthermore, the PUSCH may be used to transmit HARQ-ACK and/or CSI along with uplink data not including the random access message 3. Furthermore, the PUSCH may be used to transmit CSI only or HARQ-ACK and CSI only. In other words, the PUSCH may be used to transmit the uplink control information only.

Here, the base station apparatus 3 and the terminal apparatus 1 exchange (transmit and/or receive) signals with each other in higher layers. For example, the base station apparatus 3 and the terminal apparatus 1 may transmit and/or receive RRC signaling (also referred to as an RRC message and RRC information) in a Radio Resource Control (RRC) layer. The base station apparatus 3 and the terminal apparatus 1 may transmit and receive a Medium Access Control (MAC) control element in a MAC layer, respectively. Here, the RRC signaling and/or the MAC control element is also referred to as higher layer signaling.

In the present embodiment, "higher layer parameter", "higher layer message", "higher layer signal", "higher layer information", and "higher layer information element" may be regarded to have the same meaning.

The PUSCH may be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, user-equipment-specific information (information unique to user equipment) may be transmitted through signaling dedicated to the certain terminal apparatus 1.

In FIG. 1, the following uplink physical signal is used in the uplink radio communication. Here, the uplink physical signal is not used to transmit information output from the higher layers but is used by the physical layer.

Uplink reference signal (UL RS)

According to the present embodiment, the following two types of uplink reference signals are used.

Demodulation reference signal (DMRS)
Sounding reference signal (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both the PUSCH and the DMRS is hereinafter referred to simply as transmission of the PUSCH. Transmission of both the PUCCH and the DMRS is hereinafter referred to simply as transmission of the PUCCH.

The SRS is not associated with the transmission of the PUSCH or the PUCCH. The base station apparatus 3 may use the SRS to measure a channel state. The SRS is transmitted using the last SC-FDMA symbol within the uplink subframe or an SC-FDMA symbol in Uplink Pilot Time Slot (UpPTS).

In FIG. 1, the following downlink physical channels are used for downlink radio communication from the base station apparatus 3 to the terminal apparatus 1. Here, the downlink physical channels are used to transmit the information output from the higher layers.

Physical broadcast channel (PBCH)
Physical control format indicator channel (PCFICH)
Physical hybrid automatic repeat request indicator channel (PHICH)
Physical downlink shared channel (PDSCH)
Physical multicast channel (PMCH)
Physical downlink control channel (PDCCH)
Enhanced physical downlink control channel (EPDCCH)

PBCH is used for broadcasting a Master Information Block (MIB, a Broadcast Channel (BCH)) that is shared by the terminal apparatuses 1.

The PCFICH is used for transmission of information indicating a region (OFDM symbols) to be used for transmission of the PDCCH.

The PHICH is used for transmission of a HARQ indicator (HARQ feedback or response information) indicating an ACKnowledgement (ACK) or a Negative ACKnowledgement (NACK) for the uplink data (Uplink Shared Channel (UL-SCH)) received by the base station apparatus 3.

The PDSCH is used to transmit downlink data (downlink shared channel (DL-SCH)). The PDSCH may be used to transmit random access response grant. The random access response grant is used for scheduling the PUSCH in a random access procedure. The random access response grant is indicated to a physical layer by a higher layer (for example, a MAC layer).

The PDSCH is used to transmit a system information message. Here, the system information message may be cell-specific information (information unique to a cell). The system information may be included in RRC signaling. The PDSCH may be used to transmit the RRC signaling and the MAC control element.

The PMCH is used to transmit multicast data (multicast channel (MCH)).

The PDCCH and the EPDCCH are used to transmit downlink control information (DCI). The downlink control information is also referred to as DCI format. The downlink control information includes downlink grant and uplink grant. The downlink grant is also referred to as downlink assignment or downlink allocation.

Here, multiple DCI formats may be defined for the downlink control information transmitted with a PDCCH and/or EPDCCH. In other words, a field for the downlink control information may be defined in a DCI format and may be mapped to information bits.

Here, a DCI format for the downlink is also referred to as a downlink DCI, downlink grant and/or downlink assignment. A DCI format for the uplink is also referred to as an uplink DCI, uplink grant and/or uplink assignment. The DCI grant may include downlink grant (DL grant) and uplink grant (UL grant).

A DCI included in the PDCCH and/or EPDCCH may include downlink grant for the PDSCH. One downlink grant may be used for scheduling a single PDSCH within a single serving cell. The downlink grant may be used for scheduling a PDSCH within the same subframe as the subframe used for transmitting the downlink grant.

The downlink grant may include information on downlink allocation for one or a plurality of terminal apparatuses 1. Specifically, for one or a plurality of terminal apparatuses 1, the downlink grant may include at least one of frequency allocation information (Resource allocation), Modulation and Coding (MSC), the number of transmission antenna ports, Scramble Identity (SCID), the number of layers, New Data Indicator, Redundancy Version (RV), the number of transport block, predocoder information, and information on a transmission scheme.

The DCI in the PDCCH and/or EPDCCH may include uplink grant for the PUSCH. The uplink grant is used for scheduling a single PUSCH within a single serving cell. The uplink grant is used for scheduling a PUSCH within the fourth or later subframe from the subframe used for transmitting the uplink grant.

The uplink grant transmitted with the PDCCH and/or EPDCCH includes a DCI format 0. The PUSCH transmission scheme corresponding to the DCI format 0 is single antenna port. The terminal apparatus 1 uses a single antenna port transmission scheme for the PUSCH transmission corresponding to the DCI format 0. The PUSCH to which the single antenna port transmission scheme is applied is used for transmitting a single codeword (single transport block).

The uplink grant transmitted on the PDCCH and/or EPDCCH includes a DCI format 4. The PUSCH transmission scheme corresponding to the DCI format 4 is closed loop spatial multiplexing. The terminal apparatus 1 uses a closed loop spatial multiplexing transmission scheme for the PUSCH transmission corresponding to the DCI format 4. The PUSCH to which the closed loop spatial multiplexing transmission scheme is applied is used for transmitting up to two codewords (up to two transport blocks).

The physical channel and the physical signal that are transmitted in each of the subframes will be described below.

Figure 4:
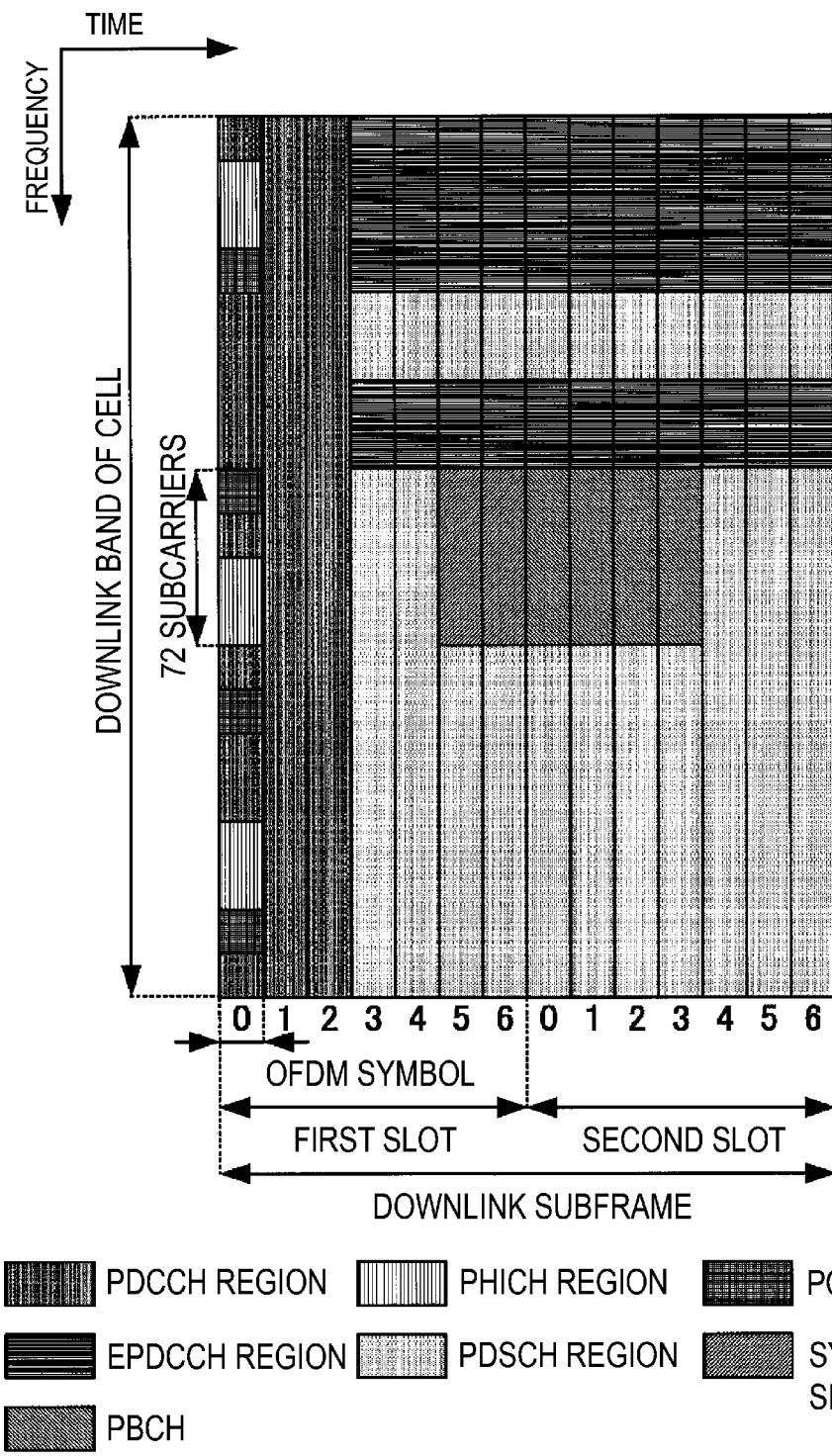
FIG. 4 is a diagram illustrating one example of allocation of a physical channel and mapping of a physical signal to a downlink subframe according to the present embodiment.

FIG. 4 is a diagram illustrating one example of allocation of a physical channel and mapping of a physical signal to a downlink subframe according to the present embodiment. In FIG. 4, the horizontal axis represents a time axis, and the vertical axis represents a frequency axis. In the downlink subframe, the base station apparatus 3 can transmit the downlink physical channel (the PBCH, the PCFICH, the PHICH, the PDCCH, the EPDCCH, or the PDSCH), and the downlink physical signal (the synchronization signal or the downlink reference signal). Moreover, the PBCH is transmitted only in a subframe 0 within the radio frame. The synchronization signal is only mapped to subframes 0 and 5 within a radio frame.

Multiple PDCCHs are frequency-multiplexed and time-multiplexed in a PDCCH region. Multiple EPDCCHs are frequency-multiplexed and time-multiplexed in an EPDCCH region. Multiple PDSCHs are frequency-multiplexed and spatial-multiplexed in a PDSCH region. The PDCCH is time-multiplexed with the PDSCH and the EPDCCH. For example, the EPDCCH is frequency-multiplexed with the PDSCH.

Configurations of the PDCCH and the EPDCCH according to the present embodiment will be described below.

A candidate of a resource with which the terminal apparatus 1 monitors the PDCCH will be referred to as a PDCCH candidate. Here, the PDCCH candidates are candidates which the PDCCH may be mapped to and/or transmitted on by the base station apparatus 3. Furthermore, "monitor" may imply that the terminal apparatus 1 attempts to decode each PDCCH in the set of PDCCH candidates in accordance with each of all the monitored DCI formats.

The set of PDCCH candidates to be monitored by the terminal apparatus 1 is also referred to as a search space. The search space may include a Common Search Space (CSS). For example, the CCS may be defined as a space common to multiple terminal apparatuses 1. The CCS may include a Control Channel Element (CCE) of an index defined in advance by a specification and the like.

The search space may include a UE-specific Search Space (USS). For example, an index of the CCE constituting the USS may be given at least based on a C-RNTI assigned to the terminal apparatus 1. The terminal apparatus 1 may monitor the PDCCHs in the CSS and/or USS to detect a PDCCH destined to the terminal apparatus 1 itself.

The PDCCH and the PDCCH candidates each include one or a plurality of control channel elements (CCEs) within the PDCCH region. Each of the CCEs constituting the PDCCH region is denoted with a number for identifying the CCE. The CCEs are numbered based on a predetermined rule. The CCEs each include nine different Resource Element Groups (REGs) dispersed in frequency and time domains within the PDCCH region. The REGs each include four resource elements (REs) with contiguous frequency domains. The REs constituting the REG are REs other than those for which a CRS is used. The number of CCEs constituting a single PDCCH candidate is referred to as an aggregation level.

A candidate of a resource with which the terminal apparatus 1 monitors the EPDCCH will be referred to as an EPDCCH candidate. Here, the EPDCCH candidates are candidates which the EPDCCH may be mapped to and/or transmitted on by the base station apparatus 3. Furthermore "monitor" may imply that the terminal apparatus 1 attempts to decode each EPDCCH in the set of EPDCCH candidates in accordance with each of all the monitored DCI formats.

The base station apparatus 3 may set one or two EPDCCH-PRB-sets to the terminal apparatus 1. The EPDCCH region may include the one or two EPDCCH-PRB-sets. The EPDCCH-PRB-set is a set of physical resource blocks (PRBs) including an PRB with which the terminal apparatus 1 monitors the EPDCCH. The base station apparatus 3 transmits information indicating a plurality of PRBs constituting the EPDCCH-PRB-set, to the terminal apparatus 1. One EPDCCH-PRB-set may overlap with another EPDCCH-PRB-set in a frequency domain. The number of EPDCCH candidates may be determined, for each EPDCCH-PRB-set, based on the number of PRB pairs constituting the EPDCCH-PRB-set.

The set of EPDCCH candidates to be monitored by the terminal apparatus 1 is also referred to as a search space. The EPDCCH search space is referred to as a UE-specific Search Space (USS). For example, an index of an ECCE constituting the USS may be given at least based on a C-RNTI assigned to the terminal apparatus 1. The terminal apparatus 1 may monitor the EPDCCHs in the USS to detect a EPDCCH destined to the terminal apparatus 1 itself. Here, the EPDCCH USS is defined for each EPDCCH-PRB-set.

The EPDCCH and the EPDCCH candidate include one or a plurality of Enhanced CCEs (ECCEs) within the EPDCCH region. Each of the ECCEs in the EPDCCH region is denoted with a number for identifying the ECCE. Each of the ECCEs includes four Enhanced REGs. Each of the EREGs includes nine REs. The number of ECCEs constituting a single EPDCCH/EPDCCH candidate is referred to as an aggregation level.

An RNTI assigned to the terminal apparatus 1 by the base station apparatus 3 may be used for the transmission using the PDCCH and/or the EPDCCH. Specifically, Cyclic Redundancy Check (CRC) parity bits are attached to the DCI format (or downlink control information), and after the attaching, the CRC parity bits are scrambled with the RNTI. Here, the CRC parity bits attached to the DCI format may be obtained from a payload of the DCI format.

In the present embodiment, the "CRC parity bit", the "CRCbit", and the "CRC" may all be regarded as having the same meaning. The "PDCCH for transmitting the DCI format to which the CRC parity bits are attached", the "PDCCH including the CRC parity bits and including the DCI format", the "PDCCH including the CRC parity bits", and the "PDCCH including the DCI format" may all be regarded as having the same meaning. The "PDCCH including X" and "the PDCCH with X" may be regarded as having the same meaning. The terminal apparatus 1 may monitor the DCI format. The terminal apparatus 1 may monitor the DCI. The terminal apparatus 1 may monitor the PDCCH.

The terminal apparatus 1 attempts to decode the DCI format to which the CRC parity bits scrambled with the RNTI are attached, and detects, as a DCI format destined for the terminal apparatus 1 itself, the DCI format for which the CRC has been successful (also referred to as blind coding). In other words, the terminal apparatus 1 may detect the PDCCH with the CRC scrambled with the RNTI. The terminal apparatus 1 may detect the PDCCH including the DCI format to which the CRC parity bits scrambled with the RNTI are attached.

Here, the RNTI may include a Cell-Radio Network Temporary Identifier (C-RNTI). For example, the C-RNTI may be an identifier unique to the terminal apparatus 1 and used for the identification in RRC connection and scheduling. The C-RNTI may be used for dynamically scheduled unicast transmission.

The RNTI may further include a Semi-Persistent Scheduling C-RNTI (SPS C-RNTI). For example, the SPS C-RNTI is an identifier unique to the terminal apparatus 1 and used for semi-persistent scheduling. The SPS C-RNTI may be used for semi-persistently scheduled unicast transmission. Here, the semi-persistently scheduled transmission may include the meaning of a periodically scheduled transmission.

The RNTI may include a Random Access RNTI (RA-RNTI). For example, the RA-RNTI is an identifier used for transmission of a random access response message. In other words, the RA-RNTI may be used for the transmission of the random access response message in a random access procedure. For example, the terminal apparatus 1 may monitor the PDCCH with the CRC scrambled with the RA-RNTI in a case where a random access preamble is transmitted. The terminal apparatus 1 may receive a random access response on the PDSCH in accordance with detection of the PDCCH with the CRC scrambled with the RA-RNTI.

RNTI may include a Temporary C-RNTI. For example, the Temporary C-RNTI may be an identifier unique to the preamble transmitted by the terminal apparatus 1 and used during a contention base random access procedure. The temporary C-RNTI may be used for dynamically scheduled transmission.

The RNTI may further include a Paging RNTI (P-RNTI). The P-RNTI may be an identifier used for paging and notification of system information modification. For example, the P-RNTI may be used for paging and transmission of a system information message. For example, the terminal apparatus 1 may receive paging on the PDSCH in accordance with detection of the PDCCH with the CRC scrambled with the P-RNTI.

The RNTI may further include a System Information RNTI (SI-RNTI). For example, the SI-RNTI may be an identifier used for broadcast of the system information. For example, the SI-RNTI may be used for transmission of the system information message. For example, the terminal apparatus 1 may receive the system information message on the PDSCH in accordance with detection of the PDCCH with the CRC scrambled with the SI-RNTI.

Here, the PDCCH or the EPDCCH with the CRC scrambled with the C-RNTI may be transmitted in the USS or CSS. The PDCCH or the EPDCCH with the CRC scrambled with the SPS C-RNTI may be transmitted in the USS or CSS. The PDCCH with the CRC scrambled with the RA-RNTI may be transmitted only in the CSS. The PDCCH with the CRC scrambled with the P-RNTI may be transmitted only in the CSS. The PDCCH with the CRC scrambled with the SI-RNTI may be transmitted only in the CSS. The PDCCH with the CRC scrambled with the Temporary C-RNTI may be transmitted only in the CSS.

In FIG. 1, the following downlink physical signals are used for downlink radio communication. Here, the downlink physical signals are not used to transmit the information output from the higher layers but is used by the physical layer.

Synchronization signal (SS)
Downlink reference signal (DL RS)

The synchronization signal is used for the terminal apparatus 1 to take synchronization in the frequency domain and the time domain in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used by the terminal apparatus 1 to perform channel compensation on a downlink physical channel. The downlink reference signal is used in order for the terminal apparatus 1 to obtain the downlink channel state information.

According to the present embodiment, the following five types of downlink reference signals are used.

Cell-specific reference signal (CRS)
UE-specific reference signal (URS) relating to the PDSCH
Demodulation reference signal (DMRS) relating to the EPDCCH
Non-zero power channel state information-reference signal (NZP CSI-RS)
Zero power channel state information-reference signal (ZP CSI-RS)

The CRS is transmitted in all the subframes. The CRS is used to perform demodulation of the PBCH/PDCCH/PHICH/PCFICH/PDSCH. The CRS may be used in order for the terminal apparatus 1 to calculate the downlink channel state information. The PBCH/PDCCH/PHICH/PCFICH is transmitted on an antenna port used for transmission of the CRS.

The URS relating to the PDSCH is transmitted in a subframe and in a band that are used for transmission of the PDSCH to which the URS relates. The URS is used to demodulate the PDSCH to which the URS relates. The PDSCH is transmitted on an antenna port used for transmission of the CRS or the URS.

For example, a DCI format 1A is used to schedule the PDSCH transmitted on the antenna port used for the transmission of the CRS. A DCI format 2D is used to schedule the PDSCH transmitted on the antenna port used for the transmission of the URS. The payload size (the number of bits) of the DCI format is defined for each DCI format. The set of information in the DCI format 1A is different from that in the DCI format 2D.

DMRS relating to EPDCCH is transmitted in a subframe and a band that are used for transmission of EPDCCH to which DMRS relates. DMRS is used to demodulate EPDCCH to which DMRS relates. The EPDCCH is transmitted on an antenna port used for transmission of the DMRS.

The NZP CSI-RS is transmitted in a subframe that is configured. A resource in which the NZP CSI-RS is transmitted is configured by the base station apparatus. The NZP CSI-RS is used in order for the terminal apparatus 1 to calculate the downlink channel state information.

A resource for the ZP CSI-RS is configured by the base station apparatus. The base station apparatus does not transmit the ZP CSI-RS. The base station apparatus transmits neither the PDSCH nor the EPDCCH in a resource configured for the ZP CSI-RS. For example, a resource for transmitting the NZP CSI-RS in one cell is set to be a resource for the ZP CSI-RS in a cell adjacent to the cell. Thus, the terminal apparatus can measure the channel state information using the CSI-RS in the one cell free of interference from the adjacent cell.

The downlink physical channels and the downlink physical signals are collectively referred to as a downlink signal. The uplink physical channel and the uplink physical signal are also collectively referred to as an uplink signal. The downlink physical channels and the uplink physical channels are collectively referred to as a physical channel. The downlink physical signals and the uplink physical signals are collectively referred to as physical signals.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

Hereinafter, carrier aggregation will be described.

Here, one or multiple serving cells may be configured for the terminal apparatus 1. A technology in which the terminal apparatus 1 communicates via the multiple serving cells is referred to as cell aggregation or carrier aggregation.

One or multiple configured serving cells may include one primary cell and one or multiple secondary cells. The primary cell may be a serving cell on which an initial connection establishment procedure has been performed, a serving cell in which a connection re-establishment procedure has been started, or a cell indicated as a primary cell during a handover procedure. Here, the primary cell may be used to transmit PUCCH. Here, upon an RRC connection being established or later, a secondary cell(s) may be configured.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 may simultaneously perform transmission and/or reception on multiple physical channels in one or multiple serving cells (component carrier(s)). Here, transmission of one physical channel may be performed in one serving cell (component carrier) of the multiple serving cells (component carriers).

Here, the base station apparatus 3 may configure one or multiple serving cells through higher layer signaling (RRC signaling for example). For example, one or multiple secondary cells may be configured to form a set of multiple serving cells with a primary cell.

The base station apparatus 3 may activate or deactivate one or multiple serving cells through higher layer signaling (for example, a MAC control element). For example, the base station apparatus 3 may activate or deactivate one or a plurality of serving cells configured by using the RRC signaling. The terminal apparatus 1 may transmit a CSI (aperiodic CSI for example) only corresponding to the activated serving cell.

Here, linking may be defined between the uplink (e.g., uplink component carrier) and the downlink (e.g., the downlink component carrier). More specifically, in accordance with the linking between the uplink and the downlink, the serving cell for uplink grant (serving cell on which PUSCH transmission scheduled via uplink grant (uplink transmission) is performed) may be identified. In such a case, there is no Carrier Indicator Field in the downlink assignment or the uplink grant.

In other words, the downlink assignment received in the primary cell may correspond to downlink transmission in the primary cell. Moreover, the uplink grant received in the primary cell may correspond to uplink transmission in the primary cell. The downlink assignment received in one secondary cell may correspond to downlink transmission in the secondary cell. Moreover, the uplink grant received in one secondary cell may correspond to uplink transmission in the secondary cell.

A transmission timing of the HARQ-ACK for a PDSCH according to the present embodiment is described below. The present embodiment is described for a case where the normal CP is added to the OFDM symbol and/or SC-FDMA symbol (that is, a case where a single slot includes seven symbols, and a case where a single subframe includes 14 symbols), but may be similarly applied to a case where the extended CP is added.

For FDD, the HARQ-ACK corresponding to the PDSCH is transmitted by the terminal apparatus 1 in a subframe n, at a timing when the terminal apparatus 1 detects a PDSCH in a subframe n–k. Thus, the HARQ-ACK corresponding to the PDSCH is transmitted in a k-th subframe from the subframe used for transmitting the PDSCH.

For example, for the FDD, k may be 4. The value k that is 4 may be referred to as a normal timing. The value k may be smaller than 4. For example, the value k may be 2. The value k may be 3. The value k may be determined in accordance with the processing capacity of the terminal apparatus 1. The value k smaller than 4 may be referred to as a reduced timing.

The processing capacity of the terminal apparatus 1 may be indicated by capability information on the terminal apparatus 1. The terminal apparatus 1 may notify the base station apparatus 3 of the capability information (by transmitting the information thereto).

The capability information on the terminal apparatus 1 is described below. The capability information on the terminal apparatus 1 may be defined as capability information (reduced timing capability) on the terminal apparatus 1.

For example, the capability information on the terminal apparatus 1 may indicate actual data processing time of the terminal apparatus 1. The processing time is determined based on time required for receiving and decoding a detected signal, and time required for generating (involving modulation and coding) of a signal to be transmitted. More specifically, the capability information on the terminal apparatus 1 may indicate actual processing time (in ms for example) for HARQ-ACK for a PDSCH. The processing time HARQ-ACK for a PDSCH may be time required for generating (involving modulation and decoding) HARQ-ACK after receiving and detecting (involving decoding and blind coding) a PDCCH or an EPDCCH for scheduling the PDSCH.

The capability information on the terminal apparatus 1 may indicate capability of the terminal apparatus 1 to support an sTTI including 13 OFDM symbols and/or SC-FDMA symbols or less.

The capability information on the terminal apparatus 1 may indicate category information on the terminal apparatus 1. The category information on the terminal apparatus 1 may include information on capability of the terminal apparatus 1 to shorten the processing time The category information on the terminal apparatus 1 may include the transmission timing (the value k) of HARQ-ACK supportable by the terminal apparatus 1.

The base station apparatus 3 may determine the transmission timing (the value k) of HARQ-ACK that can be utilized by the terminal apparatus 1, based on the capability information transmitted from the terminal apparatus 1. The transmission timing (the value k) of HARQ-ACK may be configured as a higher layer parameter. The base station apparatus 3 may transmit an RRC signaling including the transmission timing (the value k) of HARQ-ACK that can be utilized by the terminal apparatus 1 to the terminal apparatus 1.

Here, the transmission timing (the value k) may be a value defined by the specification or the like, and may be known to both the base station apparatus 3 and the terminal apparatus 1.

In the present embodiment described below, the value k may be defined in accordance with the number of subframes. For example, the value k may be 2, 3, or 4. The value k may be expressed by the number of symbols (OFDM symbols and/or SC-FDMA symbols). For example, the values k and j expressed by the number of symbols may be determined based on subframe-symbol relationship in FIG. 3. The value k expressed by the number of symbols may be a predetermined value. The value k may be determined based on the length of the TTI. The TTI may include an sTTI.

As described above, HARQ-ACK indicates ACK or NACK. More specifically, the terminal apparatus 1 and the base station apparatus 3 determine ACK or NACK for a signal based on whether the signal has been successfully received (demodulated, decoded). ACK indicates that the terminal apparatus 1 or the base station apparatus 3 has successfully received the signal, and NACK indicates that the terminal apparatus 1 or the base station apparatus 3 has failed to receive the signal. The terminal apparatus 1 or the base station apparatus 3 that has received the NACK as feedback may retransmit the signal corresponding to the NACK. For example, the terminal apparatus 1 uses a PUCCH resource to transmit HARQ-ACK for the PDSCH transmitted from the base station apparatus 3. The base station apparatus 3 determines whether to retransmit the PDSCH based on the content of the HARQ-ACK for the PDSCH, transmitted from the terminal apparatus 1.

The PUCCH resource used for the transmission of the HARQ-ACK is defined in some cases. For example, the subframe for transmitting the HARQ-ACK may be the same as that for transmitting the CSI. In such a case, the terminal apparatus 1 may use the PUCCH format 2a/2b to simultaneously transmit the HARQ-ACK and the CSI with the corresponding PUCCH resource. For example, when three or more serving cells are configured for the terminal apparatus 1, the terminal apparatus 1 may use the PUCCH format 3 to transmit the HARQ-ACK with the corresponding PUCCH resource. For example, when two or more serving cells are configured for the terminal apparatus 1, the terminal apparatus 1 may use the PUCCH format 1a/1b to transmit the HARQ-ACK with the corresponding PUCCH resource.

In the present embodiment, the PUCCH resource used for transmitting the HARQ-ACK may be a PUCCH resource corresponding to the PUCCH format 1a/1b. Specifically, in the description below, the PUCCH resource according to the present embodiment corresponds to a PUCCH resource in a case where the PUCCH format 1a/1b is used.

Figure 5:
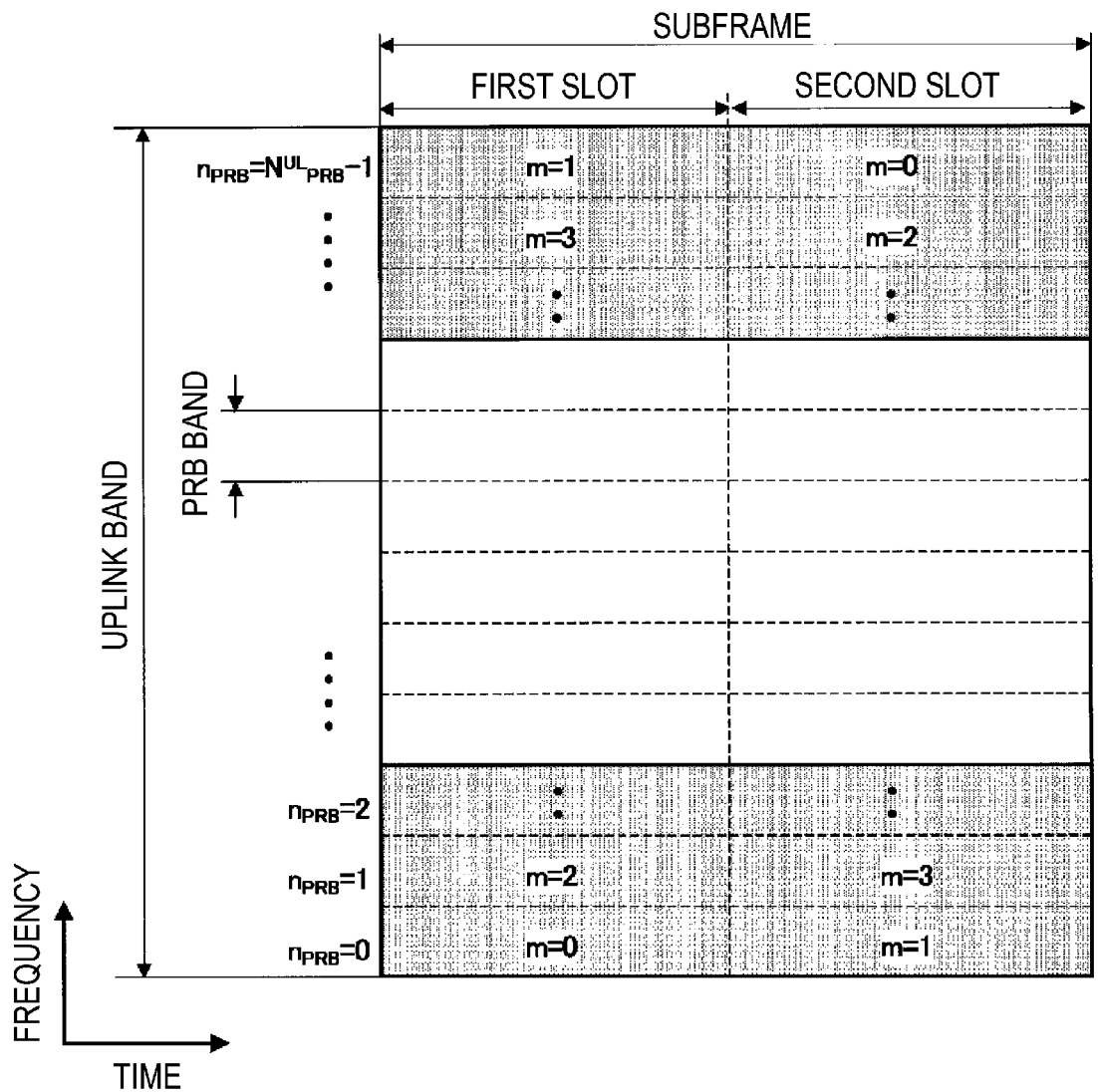
FIG. 5 is a diagram illustrating a physical resource block to which a PUCCH according to the present embodiment is mapped.

Next, a PUCCH resource used for transmitting HARQ-ACK will be described. FIG. 5 is a diagram illustrating a physical resource block to which a PUCCH according to the present embodiment is provided. In FIG. 5, the horizontal axis represents a time axis, and the vertical axis represents a frequency axis. In FIG. 5, $n_{PRB}$ is the number of a physical resource block in the frequency domain, and $N^{UL}_{PRB}$ is the number of physical resource blocks in an uplink band, and m is a number of identifying the physical resource block to which the PUCCH is mapped.

A single PUCCH is mapped to two physical resource blocks. Specifically, a single PUCCH is mapped to one physical resource block in the first slot and to one physical resource block in the second slot. The one physical resource block in the first slot is symmetrical with the one physical resource block in the second slot, about the center frequency of the uplink band.

In these two physical resource blocks, a plurality of PUCCHs are code multiplexed. Thus, in the two physical resource blocks m of which is the same, a plurality of PUCCHs are code multiplexed. The code multiplexing for a PUCCH employs orthogonal sequences and cyclic shift. Thus, the PUCCH resource is identified by a combination of the number m, the orthogonal sequences, and the cyclic shift. More specifically, information on HARQ-ACK is dispersed in an SC-FDMA sample region by using a cyclic shifted Constant Amplitude Zero-Auto Correlation (CA-ZAC) sequence, and is dispersed in four SC-FDMA symbols in a slot by using Orthogonal Sequences with the code length of 4. A symbol dispersed by two codes is mapped to two physical resource block with the number m. The number m, the cyclic shift amount, and the orthogonal sequences are calculated (determined) based on an index of the PUCCH resource.

The index of the PUCCH resource corresponding to the PUCCH resource will be described below.

For example, when a downlink grant for scheduling the PDSCH in the PDCCH region is detected, the terminal apparatus 1 calculates the index of the PUCCH resource based on the following Formula (1). In Formula (1), $n_{CCE}$ represents the CCE number of a CCE with the smallest CCE number in the CCEs constituting the PDCCH including the downlink grant. $N^{(1)}_{PUCCH}$ is a cell-specific parameter (RRC layer/higher layer parameter). More specifically, the PUCCH resource used for transmitting the HARQ-ACK corresponding to the PDSCH that has been transmitted is a PUCCH resource corresponding to an index $n^{(1, p0)}_{PUCCH}$ of a PUCCH resource obtained by adding the cell-specific parameter (RRC layer/higher layer parameter) $N^{(1)}_{PUCCH}$ to the $n_{CCE}$ that is the smallest (first) CCE number in the CCEs constituting the PDCCH including the downlink grant. Here, p0 represents an antenna port p0. $N^{(1, p0)}_{PUCCH}$ is an index of a PUCCH resource for the antenna port p0.

$$n_{PUCCH}^{(1,p0)}=n_{CCE}+N_{PUCCH}^{(1)} \quad \text{[Formula 1]}$$

For example, the PDSCH corresponding to the downlink grant includes two codewords, and thus two PUCCH resources are required for a single PDCCH as in cases such as a case where the HARQ-ACK is transmitted twice and a case of performing diversity transmission of one response information using two PUCCH resources. In such a case, the index of the second PUCCH resource is calculated based on the following Formula (2). Specifically, the PUCCH resource corresponding to the CCE number of the CCE with the smallest CCE number in the CCEs constituting the PDCCH including the downlink grant, and a PUCCH resource with an index obtained by incrementing by index such a PUCCH resource by one are used. More specifically, the second PUCCH resource used for transmitting the HARQ-ACK corresponding to the PDSCH that has been transmitted is a PUCCH resource corresponding to an index $n^{(1, p1)}_{PUCCH}$ of a PUCCH resource obtained by adding 1 and cell specific parameter (RRC layer/higher layer parameter) $N^{(1)}_{PUCCH}$ to the $n_{CCE}$ that is the smallest (first) CCE number in the CCEs constituting the PDCCH including the downlink grant. Here, p1 represents an antenna port p1. $n^{(1, p1)}_{PUCCH}$ is an index of the PUCCH resource corresponding to the antenna port p1. Thus, the index $n^{(1, p1)}_{PUCCH}$ of the PUCCH resource corresponding to the antenna port p1 is obtained by incrementing the index $n^{(1, p0)}_{PUCCH}$ of the PUCCH resource corresponding to the antenna port p0 by one.

$$n_{PUCCH}^{(1,p1)}=n_{CCE}+N_{PUCCH}^{(1)} \quad \text{[Formula 2]}$$

As described above, in the present embodiment, when a PUCCH is transmitted using a plurality of antenna ports, information on the same HARQ-ACK is transmitted with the antenna ports allocated with different PUCCH resources.

A PUCCH resource used for transmitting HARQ-ACK corresponding to PDSCH in a case where an EPDCCH including downlink grant for scheduling the PDSCH is detected in the EPDCCH-PRB-set will be described.

In the EPDCCH, distributed transmission or localized transmission may be configured for each EPDCCH-PRB-set. In the distributed transmission, the EREGs configuring each ECCE are dispersed to be mapped in a plurality of physical resource block pairs configuring the EPDCCH-PRB-set. In the localized transmission, EREGs configuring each ECCE may be mapped in one of a plurality of physical resource block pairs configuring the EPDCCH-PRB-set. In the localized transmission, the EREGs configuring each ECCE may be mapped in a plurality of contiguous physical resource block pairs in a plurality of physical resource block pairs configuring the EPDCCH-PRB-set.

For example, when an EPDCCH including a downlink grant for scheduling the PDSCH is detected and the distributed transmission is configured with the EPDCCH-PRB-set, the terminal apparatus 1 calculates an index of the PUCCH resource based on the following Formula (3).

$$n_{PUCCH}^{(1,p0)}=n_{ECCE,q}+\Delta_{ARO}+N_{PUCCH,q}^{(e1)} \quad \text{[Formula 3]}$$

In Formula (3), $n_{ECCE, q}$ is the smallest (first) ECCE number of ECCEs constituting the EPDCCH including the downlink grant, with respect to the EPDCCH-PRB-set q.

Also in the formula, $\Delta_{ARO}$ is a parameter/offset value determined based on information in the DCI format used for scheduling the PDSCH. Furthermore, $N^{(e1)}_{PUCCH, q}$ is a higher layer parameter (pucch-ResourceStartOffset-r11)/offset value configured for the EPDCCH-PRB-set q.

For example, when an EPDCCH including a downlink grant for scheduling a PDSCH is detected in the EPDCCH-PRB-set and the localized transmission is configured, the terminal apparatus 1 calculates an index of a PUCCH resource based on the following Formula (4).

$$n^{(1,p_0)}_{PUCCH} = \left\lfloor \frac{n_{ECCE,q}}{N^{ECCE,q}_{RB}} \right\rfloor \cdot N^{ECCE,q}_{RB} + n' + \Delta_{ARO} + N^{(e1)}_{PUCCH,q} \quad \text{[Formula 4]}$$

In Formula (4), $N^{ECCE,q}_{RB}$ is the number of ECCEs included in each resource block pair with respect to the EPDCCH-PRB-set q. n' is determined based on the smallest (first) ECCE number, C-RNTI, and the like.

When a PUCCH is transmitted using two antenna ports, the PUCCH resource of the antenna port p1 may have an index one larger than that of the PUCCH resource of the antenna port p0.

Figure 6:
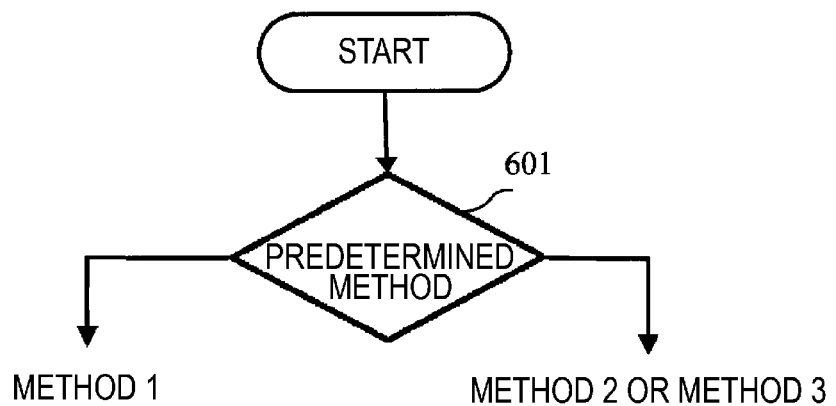
FIG. 6 is a diagram illustrating how a PUCCH resource used for the HARQ-ACK transmission is determined in the present embodiment.

FIG. 6 is a diagram illustrating how a PUCCH resource used for HARQ-ACK transmission is determined in the present embodiment. Specifically, the terminal apparatus 1 and the base station apparatus 3 may determine the PUCCH resource used for the HARQ-ACK transmission based on a predetermined condition 601. Basically, operations of the terminal apparatus 1 will be described below. However, it goes without saying that the base station apparatus 3 performs operations similar to those performed by the terminal apparatus 1.

As illustrated in FIG. 6, the terminal apparatus 1 selects (determines, decides) a method 1, a method 2, or a method 3 based on the predetermined condition 601 to determine the PUCCH resource used for the HARQ-ACK transmission.

The terminal apparatus 1 may be configured by the base station apparatus 3 in advance to execute any one of the method 2 and the method 3.

The method 1 is a method including determining, by the terminal apparatus 1, the e PUCCH resource used for the HARQ-ACK transmission based on the CCE number of the CCE with the smallest CCE number in the CCEs constituting the PDCCH destined thereto. Furthermore, the method 1 is a method including determining the PUCCH resource used for the HARQ-ACK transmission based on the ECCE number of the ECCE with the smallest ECCE number in the ECCEs constituting the EPDCCH destined thereto.

Specifically, for example, in response to detection of a DCI format for scheduling the PDSCH in the PDCCH region, the terminal apparatus 1 calculates the index of the PUCCH resource based on the smallest (first) CCE number and the cell-specific parameter (RRC layer/higher layer parameter), as in Formula (1) and/or Formula (2). The terminal apparatus 1 may determine the PUCCH resource used for the HARQ-ACK transmission based on the index of the PUCCH resource calculated.

For example, in response to detection of an EPDCCH including downlink grant for scheduling PDSCH in the EPDCCH-PRB-set, the terminal apparatus 1 calculates the index of the PUCCH resource based on Formula (3) or Formula (4) depending on which one of the distributed transmission and the localized transmission is configured. The PUCCH resource may be determined based on the index of the PUCCH resource calculated.

Here, for FDD, the PUCCH resource determined by the method 1 may be in the fourth PUCCH resource from the downlink subframe in which the PDSCH is decoded.

The method 2 is a method including allocating a shift field to the DCI format, and determining the PUCCH resource used for the HARQ-ACK transmission, by the terminal apparatus 1, based on information on the shift field allocated to the DCI format. Thus, the method 2 includes detecting, by the terminal apparatus 1, the DCI format in the PDCCH region or the EPDCCH-PRB-set, assuming that the DCI format includes a shift field.

Thus, in the method 2, the shift field is introduced without expanding the entire PUCCH resource in the uplink subframe, whereby the index of the PUCCH resource is shifted so that overlapping of the PUCCH resource between the terminal apparatuses 1 can be prevented. Thus, the shift field is used for shifting the index of the PUCCH resource.

The number of bits of the shift field may be given based on the description in the specification or may be given at least based on a part of or all of information on a higher layer parameter from the base station apparatus 3 in advance. For example, the number of bits of the shift field may be 2 bits. The number of bits of the shift field may be 3 bits. FIGS. 8A and 8B illustrate examples of a shift field mapped with a value $\Delta_{shift}$ in the present embodiment. FIG. 8A illustrates an example where the number of bits of the shift field is configured to be 2 bits. FIG. 8B illustrates an example where the number of bits of the shift field is configured to be 3 bits. Here, a, b, c, d, e, f, g, h, i, and j may each be configured to be a positive integer.

More specifically, in the method 2, the base station apparatus 3 adjusts a shifted amount indicated in the shift field by determining whether the PUCCH resource allocated to the terminal apparatus 1 contends with (overlaps with) a PUCCH resource allocated to another terminal apparatus 1. Then, the terminal apparatus 1 may refer to the index of the PUCCH resource shift field in the DCI format detected together with FIGS. 8A and 8B, and select the corresponding value $\Delta_{shift}$ to shift the index of the PUCCH resource.

For example, when the PUCCH resource of the terminal apparatus 1 does not overlap with the PUCCH resource of another terminal apparatus 1, the base station apparatus 3 maps the shift field to 00 or 000, and notifies the terminal apparatus 1 of the result. For example, when the PUCCH resource of the terminal apparatus 1 overlaps with the PUCCH resource of another terminal apparatus 1, the base station apparatus 3 selects one value $\Delta_{shift}$ in FIG. 8A or 8B to prevent the overlapping with the PUCCH resource of the other terminal apparatus 1, and notify the terminal apparatus 1 of the selected value.

For the terminal apparatus 1, the bit number of the shift field in the DCI format transmitted with the PDCCH region may be configured to be the same as or different from the DCI format transmitted with the EPDCCH-PRB-set. For example, when the DCI format is transmitted with the PDCCH, the number of bits of the shift field in the DCI format may be 2 bits. When the DCI format is transmitted with the EPDCCH, the number of bits in the DCI format may be 3 bits.

Figure 7A:
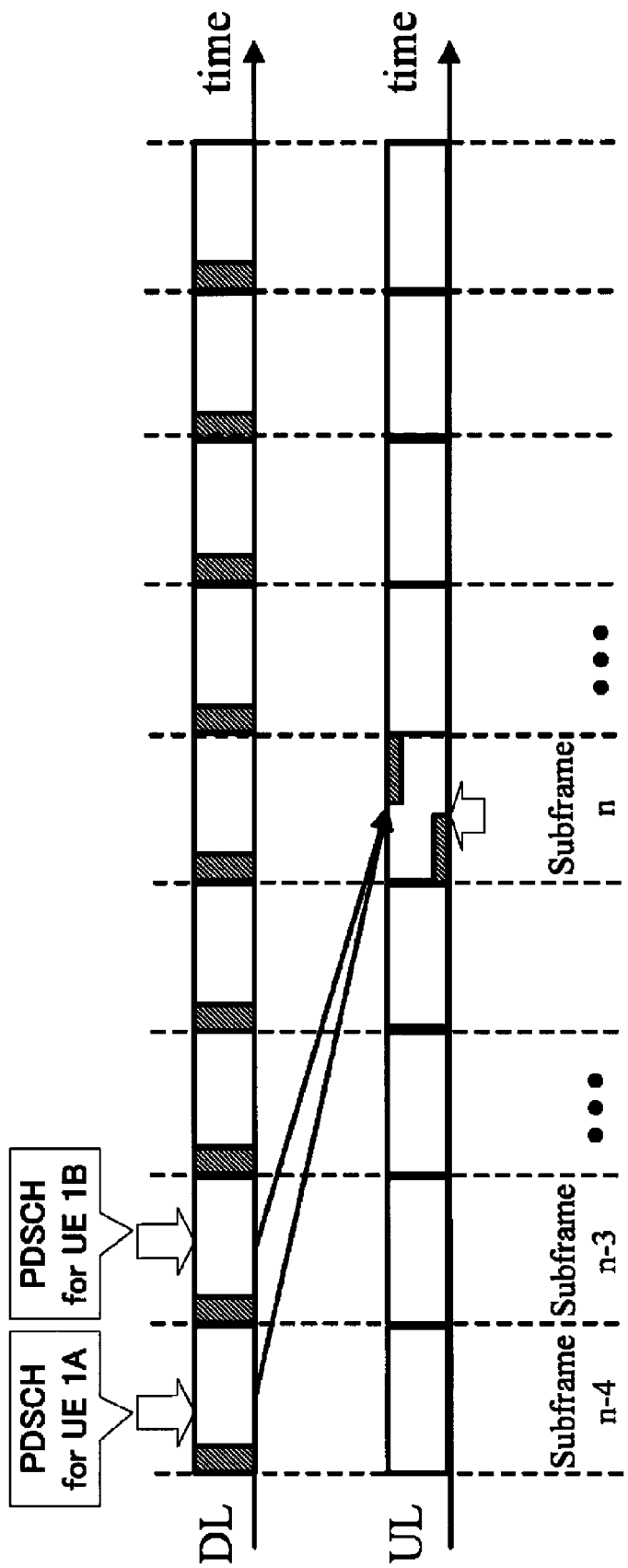
FIG. 7A is a diagram illustrating one example where the PUCCH resource overlap between terminal apparatuses 1.
Figure 7B:
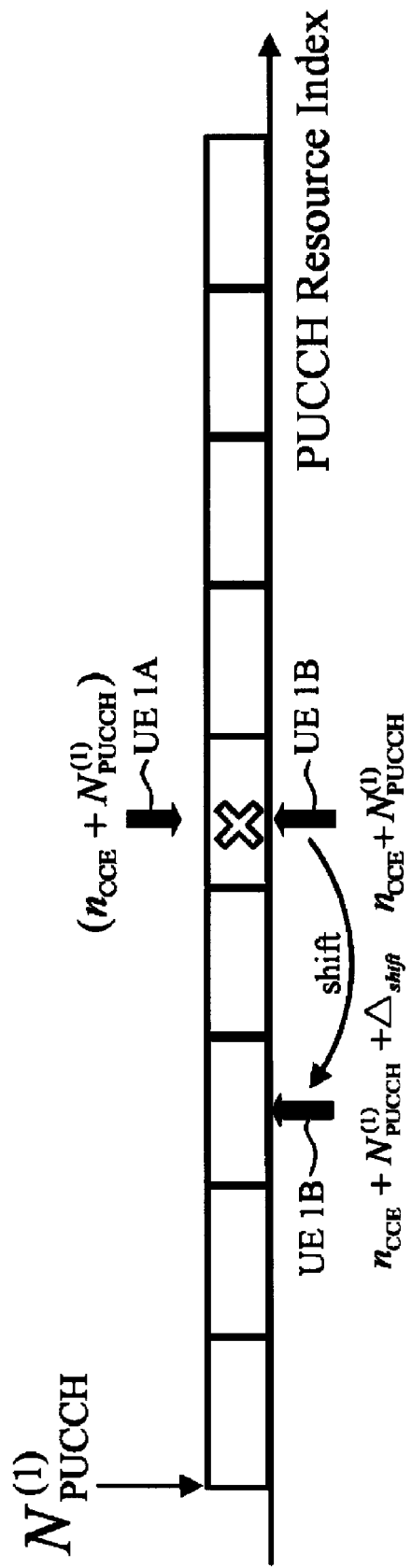
FIG. 7B is a diagram illustrating another example where the PUCCH resource overlap between terminal apparatuses 1.

FIGS. 7A and 7B are diagrams illustrating examples where the PUCCH resources of the terminal apparatuses 1 overlap in the present embodiment. In FIG. 7A, a terminal apparatus 1A detects a PDCCH for scheduling a PDSCH in a downlink subframe n−4, and transmits the HARQ-ACK corresponding to the PDSCH using an uplink subframe n. Meanwhile, a terminal apparatus 1B with the reduced timing capability detects a PDCCH for scheduling a PDSCH in a downlink subframe n−3, and transmits the HARQ-ACK corresponding to the PDSCH using the uplink subframe n. Thus, the terminal apparatus 1A and the terminal apparatus 1B transmits the HARQ-ACK with the same uplink subframe n.

Furthermore, the PUCCH resource of the terminal apparatus 1A overlaps with the PUCCH resource of the terminal apparatus 1B, also when the smallest CCE number in the PDCCH allocated to the terminal apparatus 1A is the same as the smallest CCE number in the PDCCH allocated to the terminal apparatus 1B, as illustrated in FIG. 7B. Thus, the base station apparatus 3 determines that the PUCCH resource allocated to the terminal apparatus 1B contends with the PUCCH resource allocated to the terminal apparatus 1A, and thus adjusts the shifted amount indicated in the shift field to designate the index of a PUCCH resource different from the PUCCH resource of the terminal apparatus 1A. In this case, the base station apparatus 3 may shift the index of the PUCCH resource of the terminal apparatus 1B as illustrated in FIG. 7B so as not to contend with (overlap with) a PUCCH resource allocated to another terminal apparatus 1.

As described above, the DCI format may be transmitted by using the PDCCH or the EPDCCH. Next, the method 2 will be described in detail, for each of a case where the DCI format is transmitted by using the PDCCH and a case where the DCI format is transmitted by using the EPDCCH.

For example, in the case where the DCI format is transmitted by using the PDCCH, the terminal apparatus 1 calculates the index of the PUCCH resource based on the following Formula (5). Formula (5) includes $\Delta_{shift}$ to be different from Formula (1) in the method 1. Here, $\Delta_{shift}$ represents the shifted amount of the index of the PUCCH resource independently configured for the terminal apparatus 1. Thus, $\Delta_{shift}$ is given at least based on the shift field in the DCI format. The shift field may be allocated to the DCI format as a new field.

$$n_{PUCCH}^{(1,p0)} = n_{CCE} + N_{PUCCH}^{(1)} + \Delta_{shift} \quad \text{[Formula 5]}$$

For example, when the DCI format is transmitted with the EPDCCH and the distributed transmission is configured, the terminal apparatus 1 calculates the index of the PUCCH resource based on the following Formula (6). Formula (6) is different from Formula (3) in the method 1 in that $\Delta_{ARO}$ is replaced with $\Delta_{shift}$. Here, $\Delta_{shift}$ represents the shifted amount of the index of the PUCCH resource independently configured for the terminal apparatus 1. Thus, $\Delta_{shift}$ is given at least based on the shift field in the DCI format.

$$n_{PUCCH}^{(1,p0)} = n_{ECCE,q} + \Delta_{shift} + N_{PUCCH,q}^{(e1)} \quad \text{[Formula 6]}$$

For example, when the DCI format is transmitted by using the EPDCCH and the localized transmission is configured, the terminal apparatus 1 calculates the index of the PUCCH resource based on Formula (7). Formula (7) is different from Formula (4) in the method 1 in that $\Delta_{ARO}$ is replaced with $\Delta_{shift}$. The value $\Delta_{ARO}$ is given based on an (HARQ-ACK resource offset field in the DCI format. The HARQ-ACK resource offset field is included in the DCI format transmitted with the EPDCCH. On the other hand, the HARQ-ACK resource offset field is not included in the DCI format transmitted with the PDCCH. Here, $\Delta_{shift}$ represents the shifted amount of the index of the PUCCH resource independently configured for the terminal apparatus 1. Thus, $\Delta_{shift}$ is given at least based on the shift field in the DCI format.

$$n_{PUCCH}^{(1,p0)} = \left\lfloor \frac{n_{ECCE,q}}{N_{RB}^{ECCE,q}} \right\rfloor \cdot N_{RB}^{ECCE,q} + n' + \Delta_{shift} + N_{PUCCH,q}^{(e1)} \quad \text{[Formula 7]}$$

As described above, in Formulae (6) and (7), the number of bits for expressing the value $\Delta_{shift}$ may be 2 bits. The number of bits for expressing the value $\Delta_{shift}$ may be 3 bits. For example, when the number of bits of the shift field is configured to be 2 bits, the terminal apparatus 1 may regard the HARQ-ACK resource offset field indicating the value $\Delta_{ARO}$ as a shift field indicating the value $\Delta_{shift}$. In such a case, the terminal apparatus 1 determines the value $\Delta_{shift}$ by referring to FIG. 8A for the shift field.

For example, when the number of bits of the shift field is configured to be 3 bits, the terminal apparatus 1 may determine that the DCI format transmitted by using the EPDCCH region does not include the 2-bit HARQ-ACK resource offset field indicating the value $\Delta_{ARO}$, but includes the 3 bit shift field indicating the value $\Delta_{shift}$. In this case, the terminal apparatus 1 determines the value $\Delta_{shift}$ by referring to FIG. 8B for the shift field.

For the FDD, the PUCCH resource determined by the method 2 may be in a k-th uplink subframe from the downlink subframe in which the PDSCH is decoded. Here, the value k may be smaller than 4. The value k may be 4.

The method 3 is a method including allocating the shift field to the DCI format and configuring information on a start position of the new PUCCH resource by the base station apparatus 3; and determining (i) the shift field allocated to the DCI format and determining (ii) the PUCCH resource used for the HARQ-ACK transmission based on the start position of the new PUCCH resource by the terminal apparatus 1.

Here, the shift field may be configured as in the method 2. Specifically, the number of bits of the shift field in the DCI format transmitted with the PDCCH region may be configured to be the same as or different from that in each DCI format transmitted with the EPDCCH region.

The information on the start position of the new PUCCH resource may be given based on the description in the specification, or given in advance at least based on a part of or all of the higher layer parameter from the base station apparatus 3. The method 3 is different from the methods 1 and 2, in that the start position of the new PUCCH resource is configured. By configuring the information on the start position of the new PUCCH, the PUCCH resource of the entire uplink subframe is expanded. The PUCCH resource determined by the method 3 is an expanded PUCCH resource, and can be prevented from overlapping with the PUCCH determined by the method 1. By using the shift field, contention of the expanded PUCCH resources allocated to the terminal apparatuses 1 can be prevented.

Next, the method 3 is described in detail for each of a case where the DCI format is transmitted with the PDCCH and a case where the DCI format is transmitted with the EPDCCH.

For example, when the DCI format is transmitted with the PDCCH, the terminal apparatus 1 calculates the index of the PUCCH resource based on the following Formula (8). Specifically, the terminal apparatus 1 calculates an index $n^{(1,p0)}_{PUCCH}$ of the PUCCH resource by adding the start position $N^{(s1)}_{PUCCH}$ of the new PUCCH resource and the value $\Delta_{shift}$ to the smallest (first) CCE number $n_{CCE}$ constituting the PDCCH.

$$n_{PUCCH}^{(1,p0)} = n_{CCE} + N_{PUCCH}^{(s1)} + \Delta_{shift} \quad \text{[Formula 8]}$$

As described above, the terminal apparatus 1 detects the PDCCH including the DCI format for scheduling the PDSCH in the downlink subframe n−k, and transmits the HARQ-ACK corresponding to the PDSCH with the uplink subframe n. Here, the value k may be any one of 4, 3, and 2. Here, the value of the start position $N^{(s1)}_{PUCCH}$ of the PUCCH resource may be configured to be the same for the values k that are 2 and 3. For example, in the method 3, the value indicating the start position of the index of the PUCCH resource may be configured to be different among different HARQ-ACK timings (different values k). When k is 3, a start position of the PUCCH resource may be configured to be $N^{(s1)}_{PUCCH}$. When k is 2, a start position of the PUCCH resource may be configured to be $N^{(s2)}_{PUCCH}$.

For example, when the DCI format is transmitted with the EPDCCH and the distributed transmission is configured, the terminal apparatus 1 calculates the index of the PUCCH resource based on the following Formula (9).

$$n_{PUCCH}^{(1,p0)} = n_{ECCE,q} + \Delta_{shift} + N_{PUCCH,q}^{(se1)} \quad \text{[Formula 9]}$$

For example, when the DCI format is transmitted with the EPDCCH and the localized transmission is configured, the terminal apparatus 1 calculates the index of the PUCCH resource based on the following Formula (10).

$$n_{PUCCH}^{(1,p_0)} = \left\lfloor \frac{n_{ECCE,q}}{N_{RB}^{ECCE,q}} \right\rfloor \cdot N_{RB}^{ECCE,q} + n' + \Delta_{shift} + N_{PUCCH,q}^{(se1)} \quad \text{[Formula 10]}$$

The value of the start position $N^{(se1)}_{PUCCH,q}$ of the PUCCH resource in Formulae (9) and (10) may be configured to be the same as or different from $N^{(s1)}_{PUCCH}$ in Formula (8). In Formulae (9) and (10), the number of bits of the shift field expressing the value $\Delta_{shift}$ may be 2 bits or 3 bits, as in the configuration of the value $\Delta_{shift}$ in the method 2.

For FDD, the PUCCH resource determined by the method 3 may be in a k-th uplink subframe from the downlink subframe in which the PDSCH is decoded. Here, the value k is smaller than 4.

The predetermined condition 601 may include at least one of the following first to seventh conditions. In other words, the terminal apparatus 1 may select (determine) the method of determining the PUCCH resource used for the HARQ-ACK transmission at least based on a part or all of the following first to seventh conditions.

First condition: whether the apparatus has the reduced timing capability

Second condition: HARQ-ACK transmission timing (the value k)

Third condition: whether a value TA (Timing Advance) exceeds a threshold of the maximum TA Fourth condition: which one of the PDCCH and the EPDCCH is a physical downlink control channel to which the DCI format is mapped Fifth condition: which one of the CSS and the USS is the search space to which the physical downlink control channel including the DCI format is mapped Sixth condition: Which RNTI is used for scrambling the CRC parity bits attached to the DCI format Seventh condition: Whether a higher layer parameter indicating that the reduced timing is active is configured In the first condition the reduced timing capability is a capability of the terminal apparatus 1 to decode the PDSCH in the subframe n−k and to transmit the HARQ-ACK in the subframe n using the value k smaller than 4. Specifically, the terminal apparatus 1 having the reduced timing capability decodes the PDSCH in the subframe n−k and determines the PUCCH resource used for the HARQ-ACK transmission in the uplink subframe n using the method 2 or the method 3. Here, the value k is smaller than 4. The terminal apparatus 1 not having the reduced timing capability determines the PUCCH resource used for the HARQ-ACK transmission by using the method 1. Specifically, the terminal apparatus 1 not having the reduced timing capability decodes the PDSCH in the subframe n−4, determines the PUCCH resource in the subframe n, and transmits the HARQ-ACK.

In the second condition, the terminal apparatus 1 selects the method 2 or the method 3 based on the HARQ-ACK transmission timing (the value k), and determines the PUCCH resource used for the HARQ-ACK transmission. For example, if the value k is 4, the terminal apparatus 1 determines the PUCCH resource, by using the method 1, in the fourth uplink subframe from the downlink subframe in which the PDSCH is decoded, and transmits the HARQ-ACK. When the value k is smaller than 4, the terminal apparatus 1 determines the PUCCH resource, by using the method 2 or 3, in the k-th uplink subframe from the downlink subframe in which the PDSCH is decoded, and transmits the HARQ-ACK.

Here, the value k may be determined based on a part or all of factors (i) a first higher layer parameter, (ii) a serving cell with which the PDSCH is transmitted, (iii) DCI format, (iv) the value of TA, and (v) the transport block size of the PDSCH.

Regarding the factor (i), the base station apparatus 3 may transmit the first higher layer parameter indicating the HARQ-ACK transmission timing (the value k) to the terminal apparatus 1. For example, the terminal apparatus 1 notified of the value k that is 4 with the first higher layer parameter uses the method 1 to determine the PUCCH resource. The terminal apparatus 1 notified of the value k that is smaller than 4 with the first higher layer parameter may use the method 2 or 3 to determine the PUCCH resource.

Regarding the factor (ii), the base station apparatus 3 may notify the terminal apparatus 1 of a list of a serving cell with which the reduced timing can be used and a serving cell with which the normal timing is used. For example, a serving cell is configured for the normal timing transmission only. In such a case, the terminal apparatus 1 that has decoded the PDSCH in the serving cell determines the PUCCH resource by using the method 1. For example, when the primary cell uses the transmission at the reduced timing, the terminal apparatus 1 that has decoded the PDSCH in the primary cell uses the method 2 or 3 to determine the PUCCH resource.

Regarding the factor (iii), the value k is notified or changed explicitly/implicitly with information included in the DCI format. For example, a field mapped to the DCI format may explicitly indicate (adjust) the value k. The information (the transport block size of the PDSCH) in the DCI format may implicitly indicate the value k. The terminal apparatus 1 determines the method 1, 2, or 3 based on the value k indicated by the DCI format, to determine the PUCCH resource.

Regarding the third condition, the terminal apparatus 1 determines the method for determining the PUCCH resource based on whether the value TA (Timing Advance, Timing Alignment) exceeds the threshold of the maximum TA. For example, the method 1 may be used when the value TA exceeds the threshold of the maximum TA. The method 2 or 3 may be used when TA does not exceed the threshold of the maximum TA.

Here, TA may be regarded as indicating the distance between the terminal apparatus 1 and the base station apparatus 3. The value TA may be variable in accordance with the distance between the terminal apparatus 1 and the base station apparatus 3. The value TA indicates the time difference between the transmission timing of the uplink subframe and the start of the corresponding downlink subframe. The value TA may be configured to the terminal apparatus 1 by using a TA command transmitted by the base station apparatus 3. Based on the value TA configured, the terminal apparatus 1 performs transmission at timing earlier than the subframe boarder of the uplink subframe by the value TA.

Here, the threshold of the maximum TA may be a value defined by specification or the like, and may be known to both the base station apparatus 3 and the terminal apparatus 1. The base station apparatus 3 may transmit RRC including the threshold of the maximum TA to the terminal apparatus 1.

Regarding the fourth condition, for example, when the number of bits of the shift field in the DCI format transmitted with the PDCCH region is configured to be different from that in the DCI format transmitted with the EPDCCH region, the terminal apparatus 1 determines the number of bits in the DCI format based on which one of the PDCCH and the EPDCCH is the physical downlink control channel to which the DCI format is mapped.

Regarding the fifth condition, the terminal apparatus 1 determines that method for determining the PUCCH resource based on which one of the CSS and USS is the search space to which the physical downlink control channel including the DCI format is mapped. For example, the method 1 is used to determine the PUCCH resource when the search space in which the PDCCH is detected is the CSS. For example, the method 2 or 3 is used to determine the PUCCH resource when the search space in which the PDCCH is detected is the USS. For example, the method 2 or 3 is used to determine the PUCCH resource when the search space in which the EPDCCH is detected is the USS.

The USS may include the PDCCH USS. The USS may include the EPDCCH USS.

Regarding the sixth condition, the terminal apparatus 1 determines the method for determining the PUCCH resource based on the type of RNTI with which the CRC parity bits added to the DCI format are scrambled. For example, the terminal apparatus 1 may determine the PUCCH resource by using the method 1 when the CRC parity bits added to the DCI format are scrambled with the following RNTIs.

(a) Temporary C-RNTI
(b) P-RNTI
(c) SI-RNTI

For example, the terminal apparatus 1 may determine the PUCCH resource by using the method 2 or 3 when the CRC parity bits added to the DCI format are scrambled with the following RNTIs.

(d) C-RNTI
(d) SPS-RNTI

A new RNTI type (for example, X-RNTI) may be defined for causing the execution of the method 1. Thus, the terminal apparatus 1 may determine the PUCCH resource by using the method 1 when the CRC parity bits added to the DCI format are scrambled with the X-RNTI.

A new RNTI type (for example, Y-RNTI) may be defined for causing the execution of the method 2 or 3. Thus, the terminal apparatus 1 may determine the PUCCH resource by using the method 2 or 3 when the CRC parity bits added to the DCI format are scrambled with the X-RNTI.

When the X-RNTI and the Y-RNTI are configured to the terminal apparatus 1 using a higher layer signal, switching between cases where the method 1 is used and where the method 2 or 3 is used may be achieved based on the sixth condition.

The terminal apparatus 1 may determine to use the method 1, the method 2, or the method 3 based on a combination of the conditions described above.

For example, the terminal apparatus 1 may determine to use the method 1, the method 2, or the method 3 based on a combination between the first and the second conditions. Upon being notified of the value k of 4 from the base station apparatus 3, the terminal apparatus 1 with the reduced timing capability uses the method 1 to determine the PUCCH resource and transmits the HARQ-ACK, in the fourth uplink frame from the downlink subframe in which the PDSCH is decoded. Upon being notified of the value k smaller than 4 from the base station apparatus 3, the terminal apparatus 1 with the reduced timing capability uses the method 2 or 3 to determine the PUCCH resource and transmits the HARQ-ACK, in the k-th uplink frame from the downlink subframe in which the PDSCH is decoded.

For example, the terminal apparatus 1 may determine to use the method 1, the method 2, or the method 3 based on a combination between the fifth and the sixth conditions. For example, when the PDCCH is detected in the CSS and the CRC parity bits added to the DCI format transmitted with the PDCCH are scrambled by the C-RNTI, the terminal apparatus 1 uses the method 1 to determine the PUCCH resource. For example, when the PDCCH or the EPDCCH is detected in the USS and the CRC parity bits added to the DCI format transmitted with the PDCCH of the EPDCCH are scrambled by the C-RNTI, the terminal apparatus 1 may use the method 2 or 3 to determine the PUCCH resource.

The expression in the seventh condition "a higher layer parameter indicating the availability of the reduced timing is not configured" may include "a higher layer parameter indicating that the reduced timing is unavailable is configured". When the higher layer parameter indicating that the reduced timing is available is not configured, the value k is 4, and the PUCCH resource for the HARQ-ACK transmission may be determined by using the method 1. When the higher layer parameter indicating that the reduced timing is available is configured, the value k may be given at least based on a part of or all of the first to the sixth conditions. When the higher layer parameter indicating that the reduced timing is available is configured, one of the methods 1 to 3 may be selected at least based on a part of or all of the first to the sixth conditions, and the PUCCH resource for the HARQ-ACK transmission may be determined based on the method thus selected.

More specifically, when the higher layer parameter indicating that the reduced timing is available is not configured, the terminal apparatus 1 may determine the PUCCH resource for the HARQ-ACK transmission by using the method 1 and not based on the part of or all of the first to the sixth conditions described above. For example, when the higher layer parameter indicating that the reduced timing is available is not configured, the terminal apparatus 1 uses the method 1 to determine the PUCCH resource and transmits the HARQ-ACK in the fourth uplink subframe from the downlink subframe in which the PDSCH is decoded. For example, when the higher layer parameter indicating that the reduced timing is available is not configured and the value k notified from the second condition is smaller than 4, the terminal apparatus 1 uses the method 1 to determine the PUCCH resource and transmits the HARQ-ACK in the fourth uplink subframe from the downlink subframe in which the PDSCH is decoded.

When the higher layer parameter indicating that the reduced timing is available is configured, the terminal apparatus 1 may select the method 1, the method 2, or the method 3 based on a part of or all of the first to the sixth conditions described above, and determine the PUCCH resource for the HARQ-ACK transmission based on the method thus selected. For example, in one example, when the higher layer parameter indicating that the reduced timing is available is configured, and the value k notified from the second condition is 4, the terminal apparatus 1 uses the method 1 to determine the PUCCH resource and transmits the HARQ-ACK in the fourth uplink frame from the downlink subframe in which the PDSCH is decoded. When the higher layer parameter indicating that the reduced timing is available is configured and the value k denoted from the second condition is smaller than 4, the terminal apparatus 1 uses the method 2 or the method 3 to determine the PUCCH resource and transmits the HARQ-ACK in the k-th uplink subframe from the downlink subframe in which the PDSCH is decoded.

As described above, the method for determining the PUCCH resource is determined at least based on part of or all of the first to the seventh conditions described above. In other words, the number of bits in the shift field in the DCI format may be given at least based on part of or all of the first to the seventh conditions described above. Specifically, the number of bits of the shift field in the DCI format may be regarded as 0 bits when the PUCCH resource is determined by using the method 1. The number of bits of the shift field in the DCI format may be regarded as non-0 bits when the PUCCH resource is determined by using the method 2 or the method 3. For example, the non-0 bits may be 2 bits or 3 bits.

Thus, when the number of bits of the shift field is given as 0 bits based on the conditions described above, the terminal apparatus 1 determine the PUCCH resource as in the method 1, regardless of the shift field included in the DCI format. When the number of bits of the shift field is given as the non-0 bits, the terminal apparatus 1 determine the PUCCH resource as in the method 2 or the method 3, based on the shift field included in the DCI format.

Configurations of apparatuses according to the present embodiment will be described below.

Figure 9:
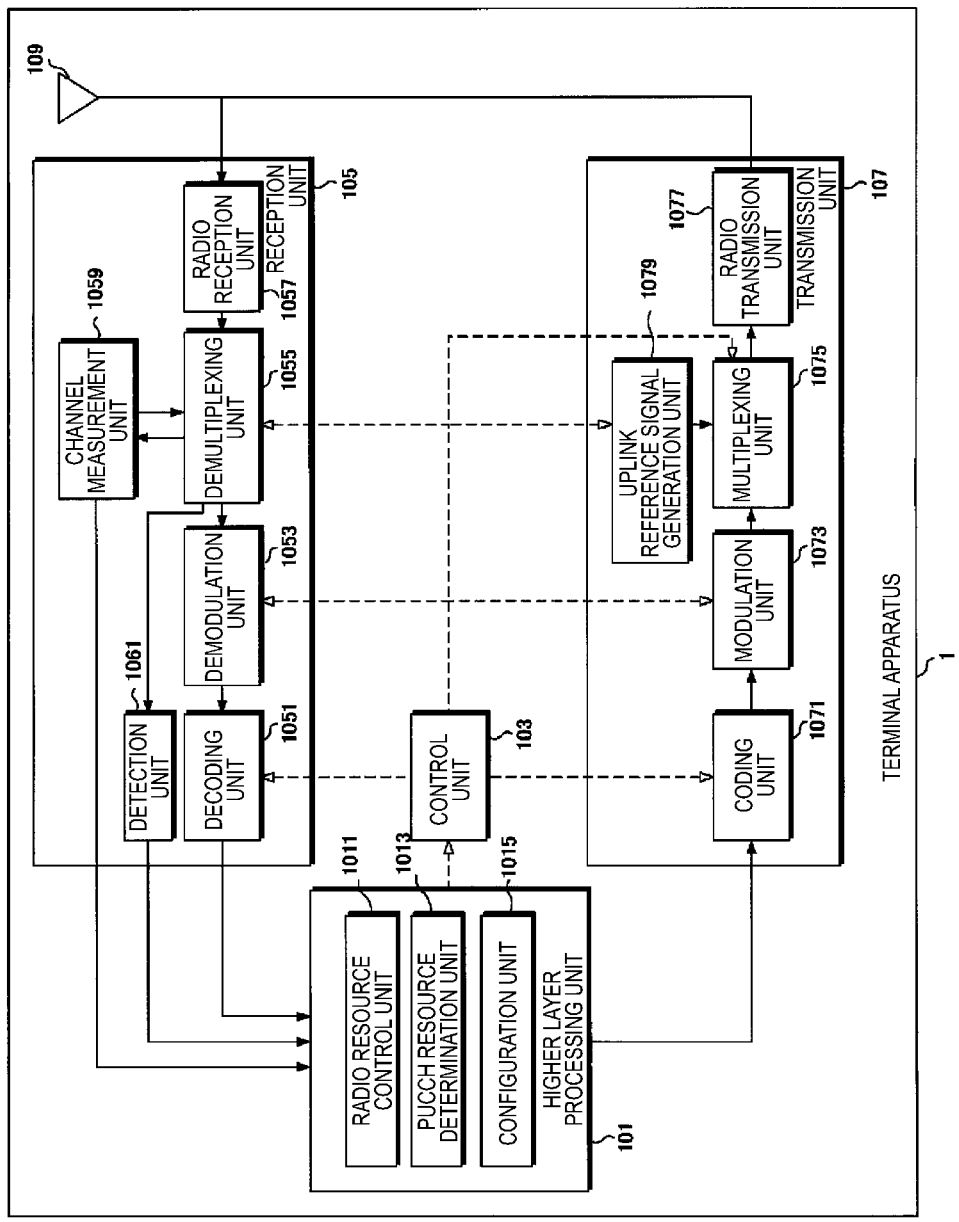
FIG. 9 is a schematic block diagram illustrating a configuration of a terminal apparatus 1 according to the present embodiment.

FIG. 9 is a schematic block diagram illustrating a configuration of the terminal apparatus 1 according to the present embodiment. As illustrated in FIG. 9, the terminal apparatus 1 is configured to include a higher layer processing unit 101, a control unit 103, a reception unit 105, a transmission unit 107, and a transmit and/or receive antenna 109. The higher layer processing unit 101 is configured to include a radio resource control unit 1011, a PUCCH resource determination unit 1013, and a configuration unit 1015. The reception unit 105 is configured to include a decoding unit 1051, a demodulation unit 1053, a demultiplexing unit 1055, a radio reception unit 1057, and a channel measurement unit 1059, and a detection unit 1061. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the radio resource control unit 1011 generates information to be mapped to each uplink channel, and outputs the generated information to the transmission unit 107.

The higher layer processing unit 101 includes a PUCCH resource determination unit 1013 determines a PUCCH resource used for transmitting uplink control information.

The configuration unit 1015 included in the higher layer processing unit 101 manages various pieces of configuration information of the terminal apparatus 1 itself. For example, a configuration unit 1015 makes various configurations in accordance with signaling received from the base station apparatus 3.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station apparatus 3 through the transmit and/or receive antenna 109, and outputs the resulting information to the higher layer processing unit 101.

The radio reception unit 1057 converts (down-converts) a downlink signal received through the transmit and/or receive antenna 109 into a signal of an intermediate frequency, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a Guard Interval (GI) from the digital signal resulting from the conversion, performs Fast Fourier Transform (FFT) on the signal from which the Guard Interval has been removed, and extracts a signal in the frequency domain.

The demultiplexing unit 1055 demultiplexes the extracted signal into PHICH, PDCCH, EPDCCH, PDSCH, and the downlink reference signal. Moreover, the demultiplexing unit 1055 makes a compensation of channels including the PHICH, the PDCCH, the EPDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal apparatus 1 itself and outputs the HARQ indicator resulting from the decoding to the higher layer processing unit 101.

The demodulation unit 1053 demodulates PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data in accordance with information of a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055.

A detection unit 1061 detects downlink control information with a PDCCH and/or an EPDCCH, and outputs the detected downlink control information to the higher layer processing unit 101. The detection unit 1061 demodulates and decodes the PDCCH and/or the EPDCCH in compliance with a QPSK modulation scheme. The detection unit 1061 attempts to blind code a PDCCH and/or an EPDCCH, and outputs downlink control information to the higher layer processing unit 101, when the blind coding is successfully performed.

The transmission unit 107 generates the uplink reference signal in accordance with the control signal input from the control unit 103, codes and modulates the uplink data (the transport block) input from the higher layer processing unit 101, multiplexes PUCCH, PUSCH, and the generated uplink reference signal, and transmits a result of the multiplexing to the base station apparatus 3 through the transmit and/or receive antenna 109.

The coding unit 1071 performs coding, such as convolutional coding or block coding, on the uplink control information input from the higher layer processing unit 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme predetermined in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through Multiple Input Multiple Output Spatial Multiplexing (MIMO SM), and performs precoding on the sequences. The modulation unit 1073 diffuses the PUCCH by using cyclic shift and/or orthogonal sequences.

An uplink reference signal generation unit 1079 generates a reference signal sequence based on physical layer cell identity (PCI) and the like for identifying the base station apparatus 3.

In accordance with the control signal input from the control unit 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a signal resulting from the multiplexing, performs modulation in compliance with an SC-FDMA scheme, attaches the Guard Interval to the SC-FDMA-modulated SC-FDMA symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 109 for transmission.

Figure 10:
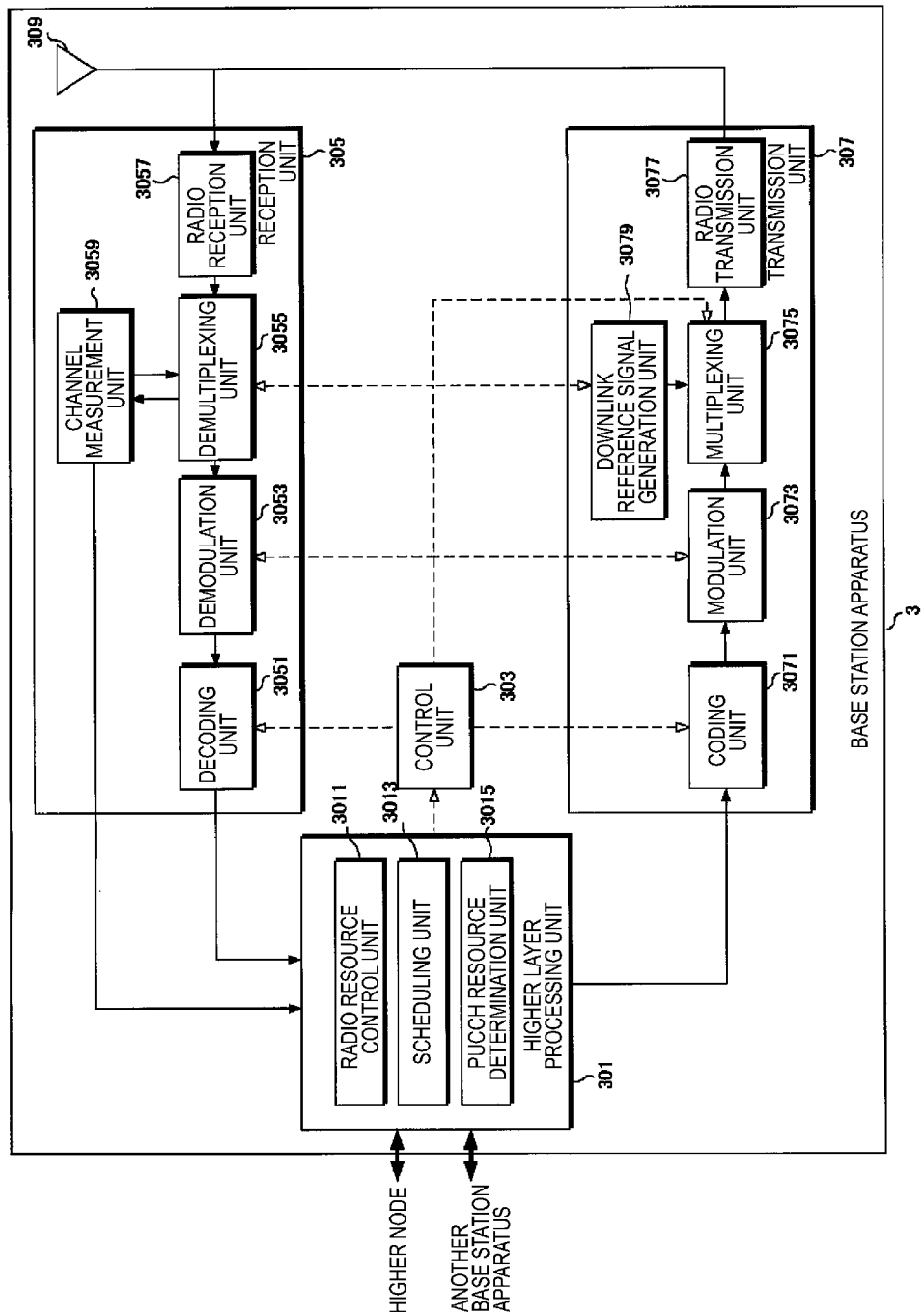
FIG. 10 is a schematic block diagram illustrating a configuration of a base station apparatus 3 according to the present embodiment.

FIG. 10 is a schematic block diagram illustrating a configuration of the base station apparatus 3 according to the present embodiment. As is illustrated, the base station apparatus 3 is configured to include a higher layer processing unit 301, a control unit 303, a reception unit 305, a transmission unit 307, and a transmit and/or receive antenna 309. The higher layer processing unit 301 is configured to include a radio resource control unit 3011, a scheduling unit 3013, and a PUCCH resource determination unit 3015. The reception unit 305 is configured to include a decoding unit 3051, a demodulation unit 3053, a demultiplexing unit 3055, a radio reception unit 3057, and a channel measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PDSCH, the system information block, the RRC signal, the MAC Control Element (CE), and the like, and outputs a result of the generation or the acquirement to the transmission unit 307. Furthermore, the radio resource control unit 3011 manages various configuration information for each of the terminal apparatuses 1.

The scheduling unit 3013 included in the higher layer processing unit 301 determines a frequency and a subframe to which the physical channels (the PDSCH and the PUSCH) are allocated, the coding rate and modulation scheme for the physical channels (the PDSCH and the PUSCH), the transmission power, and the like, from the received channel state information and from the channel estimate, channel quality, or the like input from the channel measurement unit 3059. The scheduling unit 3013 generates the control information in order to control the reception unit 305 and the transmission unit 307 in accordance with a result of the scheduling, and outputs the generated information to the control unit 303. The scheduling unit 3013 outputs the result of scheduling of the physical channels (PDSCH and PUSCH) to the control information generation unit 3015.

The PUCCH resource determination unit 3015 included in the upper layer processing unit 301 determines the PUCCH resource to be used for receiving uplink control information.

On the basis of the control information originating from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal apparatus 1 through the transmit and/or receive antenna 309, and outputs information resulting from the decoding to the higher layer processing unit 301. The radio reception unit 3057 converts (down-converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 3057 removes a portion corresponding to the Guard Interval (GI) from the digital signal resulting from the conversion. The radio reception unit 3057 performs Fast Fourier Transform (FFT) on the signal from which the Guard Interval has been removed, extracts a signal in the frequency domain, and outputs the resulting signal to the demultiplexing unit 3055.

The demultiplexing unit 3055 demultiplexes the signal input from the radio reception unit 3057 into PUCCH, PUSCH, and a signal such as the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs Inverse Discrete Fourier Transform (IDFT) on PUSCH, acquires modulation symbols, and performs reception signal demodulation, that is, demodulates each of the modulation symbols on PUCCH and PUSCH, in compliance with the modulation scheme prescribed in advance, such as Binary Phase Shift Keying (BPSK), QPSK, 16 QAM, or 64 QAM, or in compliance with the modulation scheme that the base station apparatus 3 itself notifies in advance each of the terminal apparatuses 1 with the uplink grant. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal apparatuses 1 and information designating the precoding to be performed on the sequences.

The decoding unit 3051 decodes the coded bits of PUCCH and PUSCH, which have been demodulated, at the coding rate in compliance with a coding scheme prescribed in advance, the coding rate being prescribed in advance or being notified in advance with the uplink grant to the terminal apparatus 1 by the base station apparatus 3 itself, and outputs the decoded uplink data and uplink control information to the higher layer processing unit 101. In a case where the PUSCH is re-transmitted, the decoding unit 3051 performs the decoding with the coded bits input from the higher layer processing unit 301 and retained in an HARQ buffer, and the demodulated coded bits. The channel measurement unit 3059 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the Downlink Control Information, and the downlink data that are input from the higher layer processing unit 301, multiplexes PHICH, PDCCH, EPDCCH, PDSCH, and the downlink reference signal, and transmits a result of the multiplexing to the terminal apparatus 1 through the transmit and/or receive antenna 309.

The coding unit 3071 codes the HARQ indicator, the downlink control information, and the downlink data that are input from the higher layer processing unit 301, in compliance with the coding scheme predetermined in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme predetermined in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal apparatus 1 and that is acquired in accordance with a rule prescribed in advance based on the physical cell identity (PCI) for identifying the base station apparatus 3, or the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmission unit 3077 performs Inverse Fast Fourier Transform (IFFT) on the modulation symbol resulting from the multiplexing or the like, performs the modulation in compliance with an OFDM scheme to generate an OFDM symbol, attaches the Guard Interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency signal, removes unnecessary frequency components, performs power amplification, and outputs a final result to the transmit and/or receive antenna 309 for transmission.

Various components forming the terminal apparatus 1 and the base station apparatus 3 may be circuits. For example, the transmission unit 107 may be a transmission circuit 107.

Hereinafter, various aspects of the terminal apparatus 1 and the base station apparatus 3 according to the present embodiment will be described.

(1) A first aspect of the present invention is the terminal apparatus 1 including: the reception unit 105 configured to receive a PDCCH or an EPDCCH including a DCI format, and decode PDSCH according to detection of the PDCCH or the EPDCCH; and the transmission unit 107 configured to perform HARQ-ACK transmission for transmission of the PDSCH, in which the PUCCH resource used for the HARQ-ACK transmission is determined based on a shift field in the DCI format, and the number of bits of the shift field is given at least based on part of or all of first to seventh conditions described below:

First condition: whether the apparatus has the reduced timing capability
Second condition: HARQ-ACK transmission timing;
Third condition: whether a value TA (Timing Advance) exceeds a threshold of the maximum TA
Fourth condition: which one of the PDCCH and the EPDCCH is a physical downlink control channel to which the DCI format is mapped
Fifth condition: which one of the CSS and the USS is the search space to which the physical downlink control channel including the DCI format is mapped
Sixth condition: Which RNTI is used for scrambling the CRC parity bits attached to the DCI format
Seventh condition: Whether a higher layer parameter indicating that the reduced timing is active is configured The reduced timing capability is for decoding a PDSCH in a subframe n−k, and performing the HARQ-ACK transmission in a subframe n by using a k of a value smaller than 4. The HARQ-ACK transmission timing is at least determined based on part of or all of a parameter of a first higher layer, the DCI format, the transport block size of the PDSCH, value TA and a serving cell with which the PDSCH is transmitted. The first higher layer parameter indicates a value of the HARQ-ACK transmission timing.

(2) In the first aspect of the present embodiment, the number of bits of the shift field includes κ bits, and the PUCCH resource used for the HARQ-ACK transmission is determined regardless of the shift field in the DCI format when the number of bits in the shift field is 0 bits.

(3) A second aspect of the present embodiment is the base station apparatus 3 that communicates with the terminal apparatus 1, and includes the transmission unit 307 configured to transmit a PDCCH or an EPDCCH including a DCI format and a PDSCH based on the DCI format, and a reception unit 305 configured to receive a PUCCH including HARQ-ACK for transmission of the PDSCH, in which PUCCH resource used for the HARQ-ACK transmission is determined based on a shift field in the DCI format, and the number of bits of the shift field is given at least based on part of or all of first to seventh conditions described below:

First condition: whether the terminal apparatus supports the reduced timing capability;
Second condition: HARQ-ACK transmission timing;
Third condition: whether a value TA (Timing Advance) exceeds a threshold of the maximum TA;
Fourth condition: which one of the PDCCH and the EPDCCH is a physical downlink control to which the DCI format is mapped;
Fifth condition: which one of the CSS and the USS is the search space to which the physical downlink control channel including the DCI format is mapped.
Sixth condition: Which RNTI is used for scrambling the CRC parity bits attached to the DCI format
Seventh condition: Whether a higher layer parameter indicating that the reduced timing is active is configured The reduced timing capability is for decoding a PDSCH in a subframe n−k, and performing the HARQ-ACK transmission in a subframe n by using a k of a value smaller than 4. The HARQ-ACK transmission timing is at least determined based on part of or all of a parameter of a first higher layer, the DCI format, the transport block size of the PDSCH, the value TA and a serving cell with which the PDSCH is transmitted. The first higher layer parameter indicates a value of the HARQ-ACK transmission timing.

(4) In the second aspect of the present embodiment, the number of bits of the shift field includes 0 bits, and the PUCCH resource used for the HARQ-ACK transmission is determined regardless of the shift field in the DCI format when the number of bits in the shift field is 0 bits.

(A1) One aspect of the present invention provides a terminal apparatus including: a reception unit configured to: receive a PDCCH or an EPDCCH with a DCI format and a first RRC parameter, and decode a PDSCH according to detection of the PDCCH or the EPDCCH; and a transmission unit configured to: transmit a HARQ-ACK in a subframe n according to detection of the PDSCH in a subframe n−k. Whether the PUCCH resource is given at least based on the first RRC parameter is determined at least based on part of or all of a first condition and a second condition described below:

first condition: the value k, and
second condition: which one of CSS and USS is a search space to which a physical downlink control channel including the DCI format is mapped.

(A2) One aspect of the present invention provides a base station apparatus that communicates with a terminal apparatus and includes a transmission unit configured to transmit a first RRC parameter, a PDCCH or an EPDCCH with a DCI format, and a PDSCH based on the DCI format; and a reception unit configured to transmit a HARQ-ACK in a subframe n according to transmission of the PDSCH in a subframe n−k. Whether the PUCCH resource is given at least based on the first RRC parameter is determined at least based on part of or all of a first condition and a second condition described below:

first condition: the value k, and
second condition: which one of CSS and USS is a search space to which a physical downlink control channel including the DCI format is mapped.

(A3) One aspect of the present invention provides a communication method employed for a terminal apparatus. The communication method includes: receiving a PDCCH or an EPDCCH including a DCI format, and a first RRC parameter; decoding a PDSCH according to detection of the PDCCH or the EPDCCH; and transmitting a HARQ-ACK in a subframe n according to detection of the PDSCH in a subframe n−k. Whether the PUCCH resource is given at least based on the first RRC parameter is determined at least based on part of or all of a first condition and a second condition described below:

first condition: the value k, and
second condition: which one of CSS and USS is a search space to which a physical downlink control channel including the DCI format is mapped.

(A4) One aspect of the present invention provides a communication method employed for a base station apparatus that communicates with a terminal apparatus. The communication method includes: transmitting a first RRC parameter, a PDCCH or an EPDCCH including a DCI format, and a PDSCH based on the DCI format; and transmitting a HARQ-ACK in a subframe n according to transmission of the PDSCH in a subframe n−k. Whether the PUCCH resource is given at least based on the first RRC parameter is determined at least based on part of or all of a first condition and a second condition described below:

first condition: the value k, and second condition: which one of CSS and USS is a search space to which a physical downlink control channel including the DCI format is mapped.

(A5) One aspect of the present invention provides an integrated circuit mounted on a terminal apparatus. The integrated circuit includes: a receiving circuit configured to: receive a PDCCH or an EPDCCH with a DCI format and a first RRC parameter, and decode a PDSCH according to detection of the PDCCH or the EPDCCH; and a transmitting circuit configured to: transmit a HARQ-ACK in a subframe n according to detection of the PDSCH in a subframe n–k. Whether the PUCCH resource is given at least based on the first RRC parameter is determined at least based on part of or all of a first condition and a second condition described below:

first condition: the value k, and second condition: which one of CSS and USS is a search space to which a physical downlink control channel including the DCI format is mapped.

(A6) One aspect of the present invention provides an integrated circuit mounted on a base station apparatus that communicates with a terminal apparatus. The integrated circuit includes: a transmitting circuit configured to transmit a first RRC parameter, a PDCCH or an EPDCCH with a DCI format, and a PDSCH based on the DCI format; and a receiving circuit configured to receive a HARQ-ACK in a subframe n according to transmission of the PDSCH in a subframe n–k. Whether the PUCCH resource is given at least based on the first RRC parameter is determined at least based on part of or all of a first condition and a second condition described below:

first condition: the value k, and second condition: which one of CSS and USS is a search space to which a physical downlink control channel including the DCI format is mapped.

(A7) In one aspect of the present invention, if k is equal to 4, the PUCCH resource is given without using the first RRC parameter, and if the k is equal to 3, the PUCCH resource is given at least based on the first RRC parameter.

(A8) In one aspect of the present invention, if the CSS is a search space to which the PDCCH or the EPDCCH is mapped, the PUCCH resource is given without using the first RRC parameter, and if the USS is a search space to which the PDCCH or the EPDCCH is mapped, the PUCCH resource is given at least based on the first RRC parameter.

This allows the terminal apparatus 1 to transmit the uplink data efficiently.

Each of a program running on a base station apparatus 3 and a terminal apparatus 1 according to an aspect of the present invention may be a program (program that makes a computer function) that controls a Central Processing Unit (CPU) and the like, such that the program causes a computer to operate in such a manner as to realize the functions of the above-described embodiment according to one aspect of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (an apparatus group) constituted of multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be used for, for example, a communication system, a communication device (for example, a mobile phone device, a base station apparatus, a wireless LAN device, or a sensor device), an integrated circuit (for example, a communication chip), a program, or the like.

REFERENCE SIGNS LIST 1 (1A, 1B, 1C) Terminal apparatus
3 Base station apparatus
101 Higher layer processing unit
103 Control unit
105 Reception unit
107 Transmission unit
109 Transmit and/or receive antenna
1011 Radio resource control unit
1013 PUCCH resource determination unit
1015 Configuration unit
1051 Decoding unit
1053 Demodulation unit
1055 Demultiplexing unit
1057 Radio reception unit
1059 Channel measurement unit
1061 Detection unit
1071 Coding unit
1073 Modulation unit
1075 Multiplexing unit
1077 Radio transmission unit
1079 Uplink reference signal generation unit
301 Higher layer processing unit
303 Control unit
305 Reception unit
307 Transmission unit
309 Transmit and/or receive antenna
3011 Radio resource control unit
3013 Scheduling unit
3015 PUCCH resource determination unit
3051 Decoding unit
3053 Demodulation unit
3055 Demultiplexing unit
3057 Radio reception unit
3059 Channel measurement unit
3071 Coding unit
3073 Modulation unit
3075 Multiplexing unit
3077 Radio transmission unit
3079 Downlink reference signal generation unit

The invention claimed is:

1. A terminal apparatus comprising:
receiving circuitry configured and/or programmed to:
receive a physical downlink control channel (PDCCH) with downlink control information (DCI) format, a first higher layer parameter, and a second higher layer parameter for frequency division duplex (FDD), and
decode a physical downlink shared channel (PDSCH) in subframe n-k according to detection of the PDCCH, and
transmitting circuitry configured to and/or programmed to transmit a hybrid auto repeat request-acknowledgement (HARQ-ACK) corresponding to the PDSCH in subframe n, wherein
a first parameter is given based on the first higher layer parameter and a second parameter is given based on the second higher layer parameter,
the second parameter is used for determining a physical uplink control channel (PUCCH) resource for the HARQ-ACK transmission in a case that k is equal to 3,
the first parameter is used for determining the PUCCH resource for the HARQ-ACK transmission in a case that k is equal to 4,
the second higher layer parameter is given in a case that cyclic redundancy check (CRC) parity bits added to the DCI format in the PDCCH are scrambled by cell-radio network temporary identifier (C-RNTI) and the PDCCH is in UE-specific search space (USS), and
the first higher layer parameter is given in a case that the CRC parity bits added to the DCI format in the PDCCH are scrambled by the C-RNTI and the PDCCH is in common search space (CSS).

2. A communication method performed by a terminal apparatus, the communication method comprising:
receiving a physical downlink control channel (PDCCH) with downlink control information (DCI) format, a first higher layer parameter, and a second higher layer parameter for frequency division duplex (FDD),
decoding a physical downlink shared channel (PDSCH) in subframe n-k according to detection of the PDCCH, and
transmitting a hybrid auto repeat request-acknowledgement (HARQ-ACK) corresponding to the PDSCH in subframe n, wherein
a first parameter is given based on the first higher layer parameter and a second parameter is given based on the second higher layer parameter,
the second parameter is used for determining a physical uplink control channel (PUCCH) resource for the HARQ-ACK transmission in a case that the k is equal to 3,
the first parameter is used for determining a PUCCH resource for HARQ-ACK transmission in a case that the k is equal to 4,
the second higher layer parameter is given in a case that cyclic redundancy check (CRC) parity bits added to the DCI format in the PDCCH are scrambled by cell-radio network temporary identifier (C-RNTI) and the PDCCH is in UE-specific search space (USS), and
the first higher layer parameter is given in a case that the CRC parity bits added to the DCI format in the PDCCH are scrambled by the C-RNTI and the PDCCH is in common search space (CSS).

3. A base station apparatus comprising:
transmitting circuitry configured and/or programmed to:
   transmit a physical downlink control channel (PDCCH) with downlink control information (DCI) format, a first higher layer parameter, and a second higher layer parameter for frequency division duplex (FDD), and
   transmit a physical downlink shared channel (PDSCH) in subframe n-k according to transmission of the PDCCH, and
receiving circuitry configured to and/or programmed to receive a hybrid auto repeat request-acknowledgement (HARQ-ACK) corresponding to the PDSCH in subframe n, wherein
a first parameter is given based on the first higher layer parameter and a second parameter is given based on the second higher layer parameter,
the second parameter is used for determining a physical uplink control channel (PUCCH) resource for the HARQ-ACK transmission in a case that k is equal to 3,
the first parameter is used for determining a PUCCH resource for the HARQ-ACK transmission in a case that k is equal to 4,
the second higher layer parameter is given in a case that cyclic redundancy check (CRC) parity bits added to the DCI format in the PDCCH are scrambled by cell-radio network temporary identifier (C-RNTI) and the PDCCH is in UE-specific search space (USS), and
the first higher layer Parameter is given in a case that the CRC parity bits added to the DCI format in the PDCCH are scrambled by the C-RNTI and the PDCCH is in common search space (CSS).

4. A communication method performed by a base station apparatus, the communication method comprising:
   transmitting a physical downlink control channel (PDCCH) with downlink control information (DCI) format, a first higher layer parameter, and a second higher layer parameter for frequency division duplex (FDD),
   transmitting a physical downlink shared channel (PDSCH) in subframe n-k according to transmission of the PDCCH, and
   receiving a hybrid auto repeat request-acknowledgement (HARQ-ACK) corresponding to the PDSCH in subframe n, wherein
a first parameter is given based on the first higher layer parameter and a second parameter is given based on the second higher layer parameter,
the second parameter is used for determining a physical uplink control channel (PUCCH) resource for the HARQ-ACK transmission in a case that k is equal to 3,
the first parameter is used for determining a PUCCH resource for the HARQ-ACK transmission in a case that k is equal to 4,
the second higher layer parameter is given in a case that cyclic redundancy check (CRC) parity bits added to the DCI format in the PDCCH are scrambled by cell-radio network temporary identifier (C-RNTI) and the PDCCH is in UE-specific search space (USS), and
the first higher layer parameter is given in a case that the CRC parity bits added to the DCI format in the PDCCH are scrambled by the C-RNTI and the PDCCH is in common search space (CSS).

\* \* \* \* \*